(12) United States Patent
Worely, Jr. et al.

(10) Patent No.: US 7,073,059 B2
(45) Date of Patent: Jul. 4, 2006

(54) SECURE MACHINE PLATFORM THAT INTERFACES TO OPERATING SYSTEMS AND CUSTOMIZED CONTROL PROGRAMS

(75) Inventors: William S. Worely, Jr., Centennial, CO (US); John S. Worley, Fort Collins, CO (US); Daniel J. Magenheimer, Fort Collins, CO (US); Chris D. Hyser, Fort Collins, CO (US); Tom Christian, Fort Collins, CO (US); Bret McKee, Fort Collins, CO (US); Robert Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 10/118,646

(22) Filed: Apr. 8, 2002

(65) Prior Publication Data

US 2002/0194389 A1 Dec. 19, 2002

Related U.S. Application Data

(60) Provisional application No. 60/296,958, filed on Jun. 8, 2001, provisional application No. 60/296,957, filed on Jun. 8, 2001, provisional application No. 60/297,175, filed on Jun. 8, 2001.

(51) Int. Cl.
*G06F 1/24* (2006.01)

(52) U.S. Cl. ...................... 713/168; 713/166; 713/164; 713/200; 713/201

(58) Field of Classification Search ................ 713/168, 713/166, 164, 200, 201
See application file for complete search history.

(56) References Cited

U.S. PATENT DOCUMENTS

| | | | |
|---|---|---|---|
| 5,043,878 A | 8/1991 | Ooi | |
| 5,774,652 A | 6/1998 | Smith | |
| 5,948,064 A | 9/1999 | Bertram et al. | |
| 6,131,165 A | 10/2000 | Lipkin et al. | |
| 6,154,818 A | 11/2000 | Christie | |

FOREIGN PATENT DOCUMENTS

WO   WO 01/06374 A2   1/2001

*Primary Examiner*—Thomas R. Peeso
(74) *Attorney, Agent, or Firm*—Richard P. Lange

(57) ABSTRACT

A combined-hardware-and-software secure-platform interface to which operating systems and customized control programs interface within a computer system. The combined-hardware-and-software secure-platform interface employs a hardware platform that provides at least four privilege levels, non-privileged instructions, non-privileged registers, privileged instructions, privileged registers, and firmware interfaces. The combined-hardware-and-software secure-platform interface conceals all privileged instructions, privileged registers, and firmware interfaces and privileged registers from direct access by operating systems and custom control programs, providing to the operating systems and custom control programs the non-privileged instructions and non-privileged registers provided by the hardware platform as well as a set of callable software services. The callable services provide a set of secure-platform management services for operational control of hardware resources that neither exposes privileged instructions, privileged registers, nor firmware interfaces of the hardware nor simulates privileged instructions and privileged registers. The callable services also provide a set of security-management services that employ internally generated secret data, each compartmentalized security-management service managing internal secret data without exposing the internal secret data to computational entities other than the security-management service itself.

42 Claims, 16 Drawing Sheets

| TLB.AR | TLB.PL | PRIVILEGE LEVEL | | | | DESCRIPTION |
|---|---|---|---|---|---|---|
| | | 3 | 2 | 1 | 0 | |
| 0 | 3 | R | R | R | R | READ ONLY |
| | 2 | | R | R | R | |
| | 1 | | | R | R | 1110 |
| | 0 | | | | R | |
| 1 | 3 | RX | RX | RX | RX | READ, EXECUTE |
| | 2 | | RX | RX | RX | |
| | 1 | | | RX | RX | |
| | 0 | | | | RX | |
| 2 | 3 | RW | RW | RW | RW | READ, WRITE |
| | 2 | | RW | RW | RW | |
| | 1 | | | RW | RW | |
| | 0 | | | | RW | |
| 3 | 3 | RWX | RWX | RWX | RWX | READ, WRITE, EXECUTE |
| | 2 | | RWX | RWX | RWX | |
| | 1 | | | RWX | RWX | |
| | 0 | | | | RWX | |
| 4 | 3 | R | RW | RW | RW | READ ONLY/READ, WRITE |
| | 2 | | R | RW | RW | |
| | 1 | | | R | RW | |
| | 0 | | | | RW | |
| 5 | 3 | RX | RX | RX | RWX | READ, EXECUTE/READ, WRITE, EXEC |
| | 2 | | RX | RX | RWX | |
| | 1 | | | RX | RWX | |
| | 0 | | | | RWX | |
| 6 | 3 | RWX | RW | RW | RW | READ, WRITE, EXECUTE/READ, WRITE |
| | 2 | | RWX | RW | RW | |
| | 1 | | | RWX | RW | |
| | 0 | | | | RW | |
| 7 | 3 | X | X | X | RX | EXEC, PROMOTE/READ, EXECUTE |
| | 2 | XP2 | X | X | RX | |
| | 1 | XP1 | XP1 | X | RX | |
| | 0 | XP0 | XP0 | XP0 | RX | |

*Fig. 11*

SECURE MACHINE PLATFORM THAT INTERFACES TO OPERATING SYSTEMS AND CUSTOMIZED CONTROL PROGRAMS

CROSS REFERENCE

This application claims benefit of the filing date of pending Provisional Application Nos. 60/296,958, 60/296,957, and 60/297,175, all filed Jun. 8, 2001.

TECHNICAL FIELD

The present invention relates to computer architecture, operating systems, computer system security and, in particular, to a secure machine and secure machine interface that provides secure memory-management, dispatchable object dispatching, exception handling, interrupt handling, debugging and performance monitoring, cryptographic services, and secure repository services to operating systems and customized control programs.

BACKGROUND OF THE INVENTION

Computer security has become an intensely studied and vital field of research in academic, governmental, and commercial computing organizations. While manufacturers and users of computer systems have, for many years, attempted to provide secure computer systems to control access to stored data, processing resources, and other computational resources within a computer system, the considerable efforts of computer manufacturers and users have not yet successfully produced secure computer systems. Many notorious computer-system-security breaches have been widely publicized in the past few years, including theft of money from ATM systems and computer systems within financial institutions, acquisition of highly confidential and secret documents and information from governmental, commercial, and private computer systems, a number of extremely costly and damaging computer viruses spread through email and other internet-related services, and many other severe security breaches.

Computer security issues in commercial computer systems have been, to date, addressed in a largely reactive fashion. In general, security issues are recognized after production of new commercial computer systems containing potential security breaches, and are addressed through somewhat ad hoc, post-design methodologies. Security techniques generally evolve as a result of the evolution of underlying computing technologies and resources. Although various security issues can be recognized and patched in existing systems, many additional potential security issues often remain unrecognized and available for later discovery through inadvertent and unintended errors or, more commonly, through systematic probing of computer system security features by malicious users and computing entities.

The invention, to be discussed below, relates to operating systems and operating system and computer system security. To facilitate this discussion, and to facilitate further background discussion, a concise overview of computer hardware architecture and operating systems is first provided, below.

FIG. 1 is a block diagram showing hardware, operating-system, and application-program layers within a generalized computer system. A computer system 100 can be considered to comprise a hardware layer 102, an operating system layer 104, and an application-programming layer 106. Computer systems are quite complex, with many additional components, sub-layers, and logical entity interrelationships, but the 3-layer hierarchy shown in FIG. 1 represents a logical view of computer systems commonly employed within the computer software and hardware industries.

The hardware layer 102 comprises the physical components of a computer system. These physical components include, for many computer systems, a processor 108, memory storage components 110, 112, and 114, internal buses and signal lines 116–119, bus interconnect devices 120 and 122, and various microprocessor-based peripheral interface cards 124–129. The processor 108 is an instruction-execution device that executes a stream of instructions obtained by the processor from internal memory components 110, 112, and 114. The processor contains a small number of memory storage components referred to as registers 130 that can be quickly accessed, and modem processors may, as well, include a relatively small amount of stored instructions. In general, data and instructions are read from read-only memory ("ROM") component 110, and read from, and written to, the memory components 112 and 114, via internal buses 116 and 117 and the bus interconnect device 120. Far greater data storage capacity resides in peripheral data storage devices such as disk drives, CD-ROM drives, DVD drives, and other such components that are accessed by the processor via internal buses 116, 118, and 119, interconnect devices 120 and 122, and one or more of the peripheral device interconnect cards 124–129. For example, the stored instructions of a large program may reside on a disk drive for retrieval and storage in internal memory components 112 and 114 on an as-needed basis during execution of the program. More sophisticated computers may include multiple processors with correspondingly more complex internal bus interconnections and additional components.

The operating system layer 104 is a logical layer comprising various software routines that execute on the processor 108 or one or more of a set of processors and that manage the physical components of the computer system. A computer operating system is generally thought of as the lowest-level software layer in a computer system, and serves to create a combined hardware/software environment in which user programs, including application programs, can run and which supports interactive use of computer-system services by users through various input/output ("I/O") devices.

Operating system routines, in a traditional computer system, run at higher priority than user-level application programs, coordinating concurrent execution of many application programs and providing each application program with a run-time environment that includes processor time, at least one area of memory addressed by an address space provided to the application program, and a variety of data input and output services, including access to memory components, peripheral devices, communications media, and other internal and external devices.

Each currently running program is executed in the context of a process, a logical entity defined by various state variables and data structures managed by the operating system. One important internal data structure managed by the operating system is one or more process queues 132 that contain, for each currently active process, a process-control block or similar data structure that stores data that defines the state of the currently active process managed by the operating system. The operating system 104 provides, to each concurrent program, the illusion that the program is employing the computer hardware 102 in a continuous fashion, although, in reality, the operating system 104 runs only at most one program per processor at any given instant, rapidly switching execution between the various currently active programs, restoring the context of a program prior to restarting execution of the program, and storing the context of a program in memory as the program is idled to allow another program to run. The operating system 104 also provides, to executing programs, somewhat generalized, logical interfaces through which the executing programs can access and employ many types of remote and local computing resources, including physical memory, mass-storage devices, communications networks, I/O devices, and other resources.

The application-programming and user interface layer 106 is the user-visible layer of the computer system. An application program comprises a set of stored instructions and data 134 within a memory area addressed within an address space provided by the operating system to the process executing the application program, and resources 136–142 accessed by the application program through the operating-system interface that allow the application program to store data to, and retrieve data from, external devices and database management systems, obtain system information, such as the values of an internal clock and system configuration information, and to access additional services. The memory area and resources are implemented in hardware memory, data storage, communications, and other components, and are shown in FIG. 1 within the application-programming and user interface layer 106 in a logical sense.

In early computer systems, there were no operating systems. FIG. 2 is a block diagram illustrating an early computer system. A single application program 202 runs directly on the computer system hardware 204, interfacing to the hardware via a simple hardware interface 206 comprising the machine instructions and registers provided by the hardware. An application program is loaded into the machine as a paper tape or deck of punched cards along with a set of paper tapes or punched cards encoding various computational libraries and I/O libraries providing routines needed by the application program at runtime. In early machines, an application program is loaded and executed to completion. Scheduling of application program execution is carried out by human system managers, with the paper tapes or punched cards encoding application programs physically queued in shelves or trays and manually re-ordered from first-in-first-executed order according to the priorities assigned to application programs.

Operating systems arose from a desire to automate the system management related to loading and executing application programs, and from a need to provided concurrent use and interactive use of computer systems to a number of users. Operating systems were developed for mainframe computer systems, such as the IBM System/360 series. FIG. 3 is a block diagram illustrating the logical position of an operating system within an early mainframe computer. The most privileged part of an operating system, usually called the Kernel, 302 interfaces to the computer hardware 304 through a hardware interface including non-privileged and privileged instructions and registers and hardware interruption mechanisms. The registers and instructions are partitioned into privileged and non-privileged sets in order to reserve certain machine functionality for the operating system and to prevent higher-level application programs from accessing that functionality. For example, registers involved in setting the execution priority of a running program are generally privileged, to prevent an application program from frustrating or corrupting the operating system's scheduling and prioritization of application programs. The operating system has full access to both privileged and non-privileged instructions and registers and to hardware interruption mechanisms, but exposes only non-privileged instructions and registers to application programs via the operating-system interface 308. In addition to the non-privileged instructions, the operating-system interface provides many different operating-system service routines. For example, when running on top of an operating-system interface, an application program 310 does not need to be packaged together with I/O libraries, as in the case of early computer systems lacking operating systems, but can access I/O devices via I/O service routines provided by the operating system 302.

In modern personal computer ("PC") systems, the operating system inhabits a roughly equivalent logical position within the system. FIG. 4 is a block diagram of the application, operating system, and hardware layers of a modern PC. The interface 402 between the PC hardware 404 and the operating system 406, however, includes a new firmware-services interface that may be optionally exposed, in part, to an application program. The firmware interface includes various firmware routines that provide control over hardware features, including display features.

Hardware privilege levels are used within modern operating systems to partition resources between the operating system and other routines and programs. FIGS. 5A–D illustrate the fundamental privilege-level mechanisms and features in a generalized computer hardware system. At any given period in time, an executing program is associated with a current privilege level. The privilege level is maintained in a bit-field 502 within a processor status register 504. The processor status register controls and reflects the fundamental state of the processor. Many current computer systems employ only two privilege levels, privileged and non-privileged, and therefore need only a single bit in the privilege-level bit field to control the current privilege level. Modem computer systems, as well as a few earlier systems, employ more than two privilege levels. In general, n bits in the privilege-level bit field allow for $2^n$ discrete privilege levels, ranging from privilege level 0, usually the most privileged of the privilege levels, to privilege level $2^n-1$. Resources within the computer system are generally partitioned into sets of resources accessible only to processes executing at one or more privilege levels. For example, as shown in FIG. 5B, many common machine architectures partition the instruction set 506 into a set of non-privileged instructions 508 and privileged instructions 510. The non-privileged instructions are accessible to processes running at any privilege level, while the privileged instructions are accessible only to processes running at privilege level 0. In general, operating system kernel routines run at privilege level 0, and, if correctly constructed, can exclusively use the privileged instruction set to manage execution of application-level process creation, execution, and scheduling. In addition, as shown in FIG. 5C, the entire hardware register set 512 is partitioned into a non-privileged register set 514 and a privileged register set 516, with non-privileged registers accessible to processes running at any privilege level, while the privileged registers are accessible only to processes running at privilege level 0. The processor status register 504, for example, is a privileged register, to prevent non-kernel code from attempting to promote the current privilege level and access resources, which are intended to be inaccessible to non-kernel code.

Memory can also be partitioned with respect to privilege levels, as shown in FIG. 5D. In general, memory 518 is partitioned into pages (e.g. memory page 520). A memory page is a basic unit of memory with respect to I/O operations, virtual-memory-to-physical-memory mapping, and other types of operating system activities. In many systems, each memory page may be associated with an indication of one or more privilege levels, such as privilege-level indication 522 associated with page 520. These indications may be directly incorporated as tags within the memory pages, or may reside in auxiliary data structures that describe or reference the memory pages. While instructions sets and registers are often partitioned into only two different privilege-level-based partitions, as discussed above, partitioning of memory pages with respect to privilege level may be more complex. For example, one page may be made accessible to processes executing at privilege levels 0–2, another may be made accessible to processes executing at all $2^n$ privilege levels, and other may be accessible only to processes executing at privilege level 0.

Partitioning of resources is a fundamental technique used in the design of reliable and secure operating systems, but is not, by itself, sufficient. There are many aspects of security and reliability that cannot be addressed solely through hardware-level privilege-based partitioning. FIG. 6 illustrates one example of a security and reliability breach present in many modern computer systems. A simplified block-diagram representation 602 of a computer system is shown in FIG. 6. Normally, an operating system vendor supplies the operating system layer 604 to run on the hardware layer 606 provided by a hardware vendor. In many modern computer systems, $3^{rd}$ party vendors may provide peripheral hardware I/O devices that are incorporated into the computer-system hardware by the hardware vendor or by computer system owners. These peripheral hardware devices need interfacing software routines, known as I/O drivers that are installed to run within, or in conjunction with, the operating system. For example, in FIG. 6, I/O driver 608 resides within the operating system layer 604. In general, the I/O driver 608 needs to run at the highest privilege level in order to interface with privileged register and memory resources that are not intended to be accessible to application-level programs. For example, in FIG. 6, a portion 610 of the memory resources for the machine is shown. One area in memory 612 is intended for access by application-level programs. Another area of memory 614 is intended for access only by operating system routines. This area may include, for example, stored cryptographic key information 616. Another area in memory 618 is intended for use by the I/O driver 608 and the operating system, containing I/O buffers that the I/O driver and operating system employ to exchange data.

If the I/O driver is correctly written, and does not contain malicious code, the I/O driver routines only read from, and write to, the I/O buffer area 618 of memory, and cannot interfere, through memory operations, with either the operating system or with application routines. However, neither the hardware vendor nor the operating-system vendor have control over the contents of the I/O driver. They may employ an authentication method to determine that the I/O driver was received from a particular $3^{rd}$ party vendor. They may even test the I/O driver prior to installing it. Some $3^{rd}$ party vendors do not make source code for their I/O drivers available for inspection, limiting the extent to which the I/O driver can be independently verified by the operating system and hardware vendors. It is possible that the I/O driver may include either Trojan-horse code inserted for malicious purposes, or may contain bugs. In either case, the I/O driver may attempt to access portions of memory outside the I/O buffer area 618 to which the I/O driver was intended to be restricted. In many current computer systems, there is nothing to prevent the I/O driver from reading and writing any memory area within the system, because the I/O driver generally executes at kernel-level privilege. Once an incorrect or malicious program begins to run at kernel-level privilege, the program can employ the full set of resources available to the operating system. In the current case, for example, a Trojan-horse routine within the I/O driver may begin execution during I/O-driver operation, access the cryptographic keys 616 stored in memory allocated for the operating system 614, and use other operating system routines and hardware resources to export the cryptographic keys to a remote entity.

The problem illustrated in FIG. 6 is only one of an almost limitless number of security problems that may arise in current computer systems. For many identified problems, various measures can be designed and retrofitted into the operating system in an attempt to close or narrow the system vulnerabilities associated with the problem. However, such measures are generally specific to only one or a small number of problems, and a great number of additional vulnerabilities remain undetected and potential sources of future security problems. Sometimes, the attempted fixes are incomplete or incorrect. In certain cases, the attempted fixes are themselves the source of additional problems. To date, fully secure, general purpose, commercial computer systems have not been produced, despite recognition of the desirability to produce secure systems. In fact, although the general notion of computer system security has motivated design and development efforts for many years, a clear and comprehensive understanding of computer security and of rational approaches to solving computer-security-related issues has remained elusive. Designers, manufacturers, developers, and users of computer systems have thus recognized a need for a comprehensive understanding of computer security, secure computer systems, and computer-security methodologies.

SUMMARY OF THE INVENTION

One embodiment of the present invention provides a combined-hardware-and-software secure-platform and a combined-hardware-and-software secure-platform interface to which operating systems and customized control programs interface within a computer system. This embodiment of the present invention employs a hardware platform that provides at least four privilege levels, non-privileged instructions, non-privileged registers, privileged instructions, privileged registers, and firmware interfaces. The combined-hardware-and-software secure-platform interface conceals the privileged instructions, privileged registers, and firmware interfaces from operating systems and customized control programs, providing to operating systems and customized control programs the non-privileged instructions and non-privileged registers provided by the hardware platform as well as a set of callable software services. The callable software services provide a set of secure-platform management services for operational control of hardware resources that neither expose privileged instructions and privileged registers of the hardware nor simulate privileged instructions and privileged registers. The callable services also provide a set of security-management services, also called the secure-repository, that employ internally generated secret data, each security-management service managing internal secret data without exposing the internal secret data to any computational entity other than the security-management service itself.

BRIEF DESCRIPTION OF THE DRAWINGS

FIG. 11 shows the access rights encoding used in a TLB entry.

DETAILED DESCRIPTION OF THE INVENTION

Figure 2:
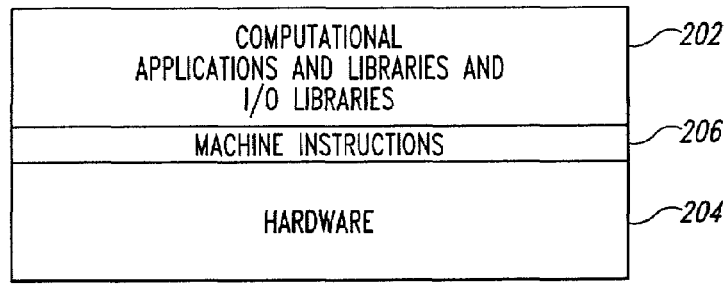
FIG. 2 is a block diagram illustrating an early computer system.
Figure 3:
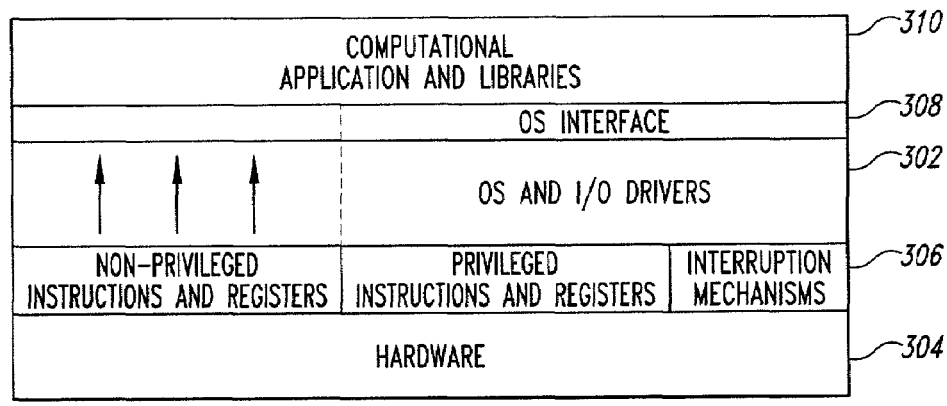
FIG. 3 is a block diagram illustrating the logical position of an operating system within an early mainframe computer.
Figure 4:
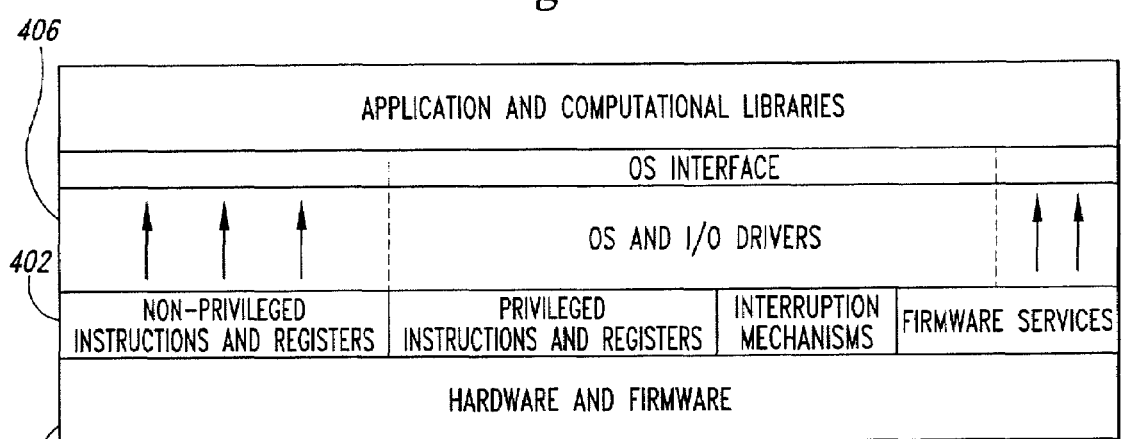
FIG. 4 is a block diagram of the application, operating system, and hardware layers of a modern PC.
Figure 5A:
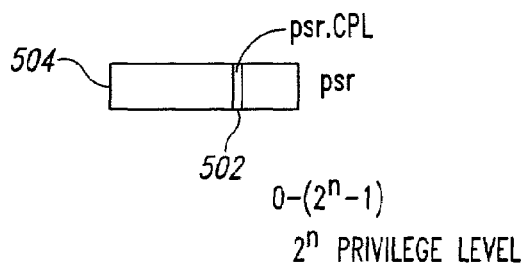
FIGS. 5A–D illustrate the fundamental privilege-level mechanisms and features in a generalized computer hardware system.
Figure 5B:
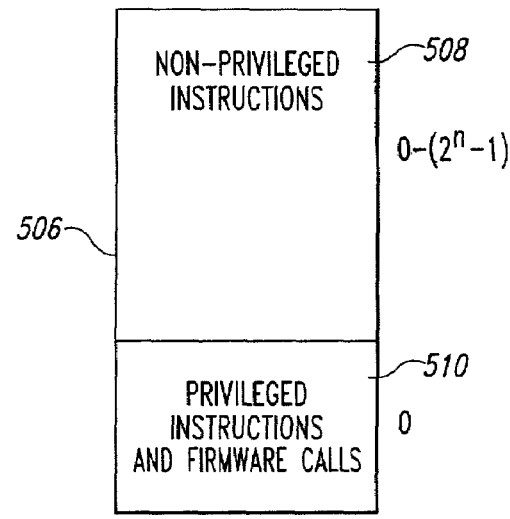
Figure 5C:
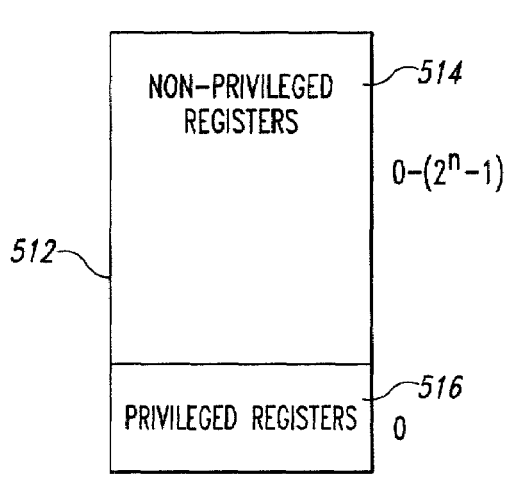
Figure 5D:
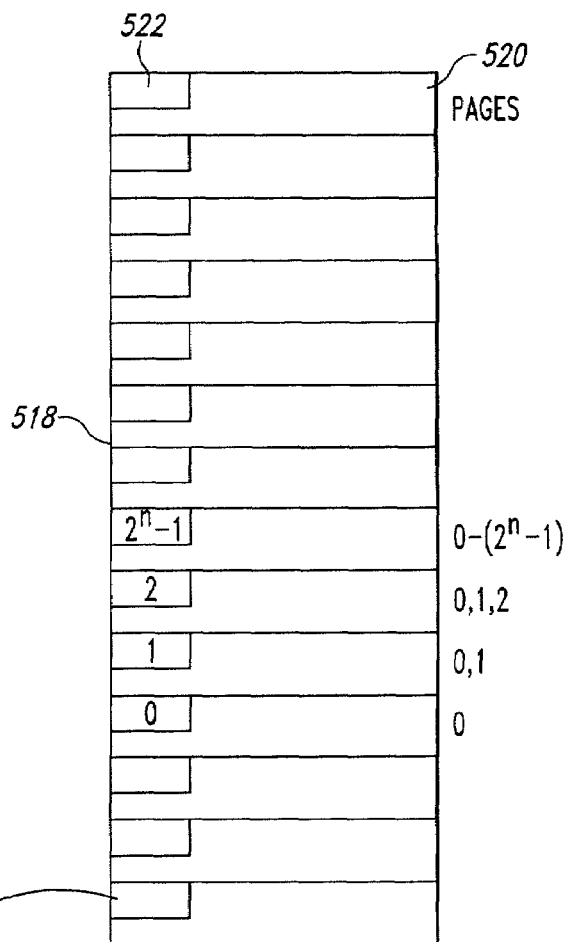

The present invention relates to computer systems and computer operating systems. More specifically, one embodiment of the present invention relates to a combined-hardware-and-software secure-platform and a combined-hardware-and-software secure-platform interface that provides a secure foundation on which one or more operating systems can be layered in order to produce secure computer systems. The combined-hardware-and-software platform and combined-hardware-and-software-platform interface represent an evolutionary step in machine/operating system interfaces. As discussed above, with reference to FIGS. 2–4, the machine/operating-system interface evolved from a set of instructions and registers, as illustrated in FIG. 2, to a set of non-privileged instructions and registers, a set of privileged instructions and registers, hardware interruption mechanisms, and a set of firmware-implemented services, as illustrated in FIG. 5. One embodiment of the present invention is a secure platform and secure-platform/operating-system interface that provides a set of non-privileged instructions and registers and a set of secure platform services that include callable routines that provide support for memory management, dispatchable object dispatching, exception handling, interruption handling, debugging and performance monitoring, cryptographic services, secure data repository services, domain control services, logical and physical processor control services, inter- and intra-domain communications services, platform policy management services, caller authentication services, and other services. Another view of this embodiment of the present invention is that the hardware and the overlying secure platform software together represent a new type of machine, just as the firmware and hardware in the system illustrated in FIG. 4 represents a new and different type of machine with respect to the earlier systems illustrated in FIGS. 2 and 3. This new machineprovides secure, basic functionalities on top of which secure operating systems and secure systems can be constructed. Rather than simply relying on hardware privilege levels, an operating system can employ an entire suite of basic functionalities that execute at a higher privilege level than the operating system, and that remain secure from the operating system.

In order to describe the combined-hardware-and-software secure-platform interface, discussions of security, an example hardware platform suitable for use in the combined-hardware-and-software secure platform, and a general discussion of cryptography are presented in three following subsections. Then, in a fourth subsection, and in Appendices A and B that follow, a detailed description of the combined-hardware-and-software secure-platform interface that represents one embodiment of the present invention is discussed in detail.

Computer Security

There are many different ways to define computer security. Quite often, security problems and security deficiencies that arise in computer systems represent entire classes of problems that were initially not recognized by system designers as security issues. Properly and comprehensively defining the term "computer security" may constitute an important and even essential step in designing a secure computer system. A step in the design of the combined-hardware-and-software secure-platform interface that represents one embodiment of the present invention is the recognition that the a secure computer system encompasses at least the following nine characteristics and properties:

Availability

An available system is a system that can be trusted and relied upon to be functioning and to respond correctly whenever an end user invokes a system service. Availability can be addressed, in part, by incorporating redundant configurations of reliable hardware components within a system, and detecting and/or compensating for incorrect operation of either a hardware or software component. However, availability also may be greatly facilitated by expanding the class of detectable errors and limiting the damage resulting from the occurrence of errors.

Confidentiality

Information stored within a computer system, transmitted across a network, or residing in archival storage needs to be intelligible only to authorized parties. Confidentiality may be greatly facilitated by specifying cryptographic ciphers and protocols that can be employed to assure that the intelligibility of data and system information can be restricted solely to authorized parties via encryption of file data, paging data, communications between local system components, and communications over the Internet.

Authentication

The identities of persons, servers, clients, appliances, printing subsystems, storage subsystems, and other hardware and software components that generate and access data need to be correctly ascertained before services are provided to these entities. Authentication may be greatly facilitated by specifying the cryptographic means and protocols by which all such identities can be authenticated.

Access Control

Access to information stored within a computer system or residing in archival storage needs to be permitted only when properly authorized. Access control may be facilitated by providing a range of access control schemes.

Nonrepudiation

In E-commerce transactions, neither the sending party nor the receiving party of messages should be able to deny the existence and transmission of messages specifying and effecting a transaction. For example, means need to be provided to insure that a party sending a message ordering a shipment of "widgets" later cannot claim that the "widgets" never were ordered. Nonrepudiation is facilitated by identifying cryptographic mechanisms and protocols, such as digital signatures, that can be used to ensure that parties to a transaction are accountable.

Policy Control

Owners and administrators need to be equipped to define for systems under their control policies that govern the behavior of the security elements of those systems.

Digital Rights Protection

Secure systems need to protect digital content, particularly guarding digital images from unauthorized duplication. Examples include currency, MPEG home entertainment content, high quality images of fine art, and printed materials for limited distribution.

Privacy

The property of privacy depends upon the preceding properties, but needs additional capabilities for managing and controlling information associated with identities of persons and groups. Information private to an individual needs to be protected from unauthorized access. In some cases, even if access is authorized, the identities of individuals should not be disclosed. Features of a system that secure privacy include: (1) legitimate collection of information about individuals, in a legitimate manner, relevant to and not in excess of, the purpose for collection; (2) maintaining accurate and up-to-date information about individuals; (3) processing information about an individual fairly and lawfully, obtaining an individual's consent for retention, use, or transfer of information to third parties; (4) individuals should be entitled to access information about themselves, including the right to have such information rectified or deleted; (5) individuals need to be told what personal information is to be collected, its intended use, the responsible entity, and the choices the individual has regarding the uses of the information; (6) individuals need to be given the ability to select and/or update the choices for dealing with their personal information; and (7) means need to be provided for demonstrating to an oversight or enforcement agency that private information has been handled correctly and lawfully.

Data Integrity

Data in the custody of a computer system is a precious and critical information asset. A secure system needs to ensure that data assets are not lost or damaged, and not subjected to unauthorized falsification, deletion, forgery, permutation, or other forms of tampering. A combination of well-designed file and data base systems, systematic back up and restore procedures, and cryptographic protections for the integrity and confidentiality of the data itself are needed to assure this property.

A Modem Computer Architecture

Figure 7:
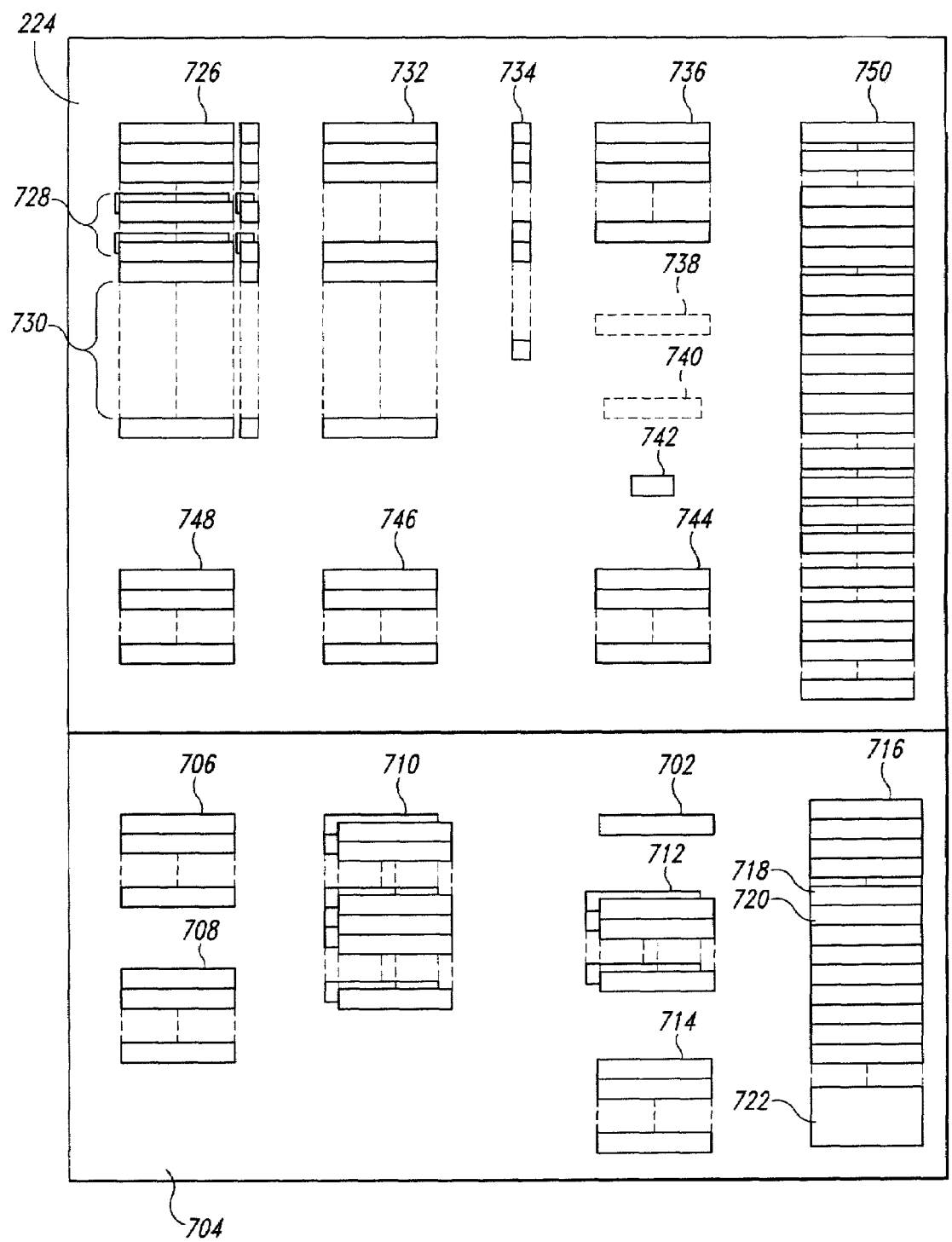
FIG. 7 is a block diagram showing the registers within one type of modern processor.
Figure 8:
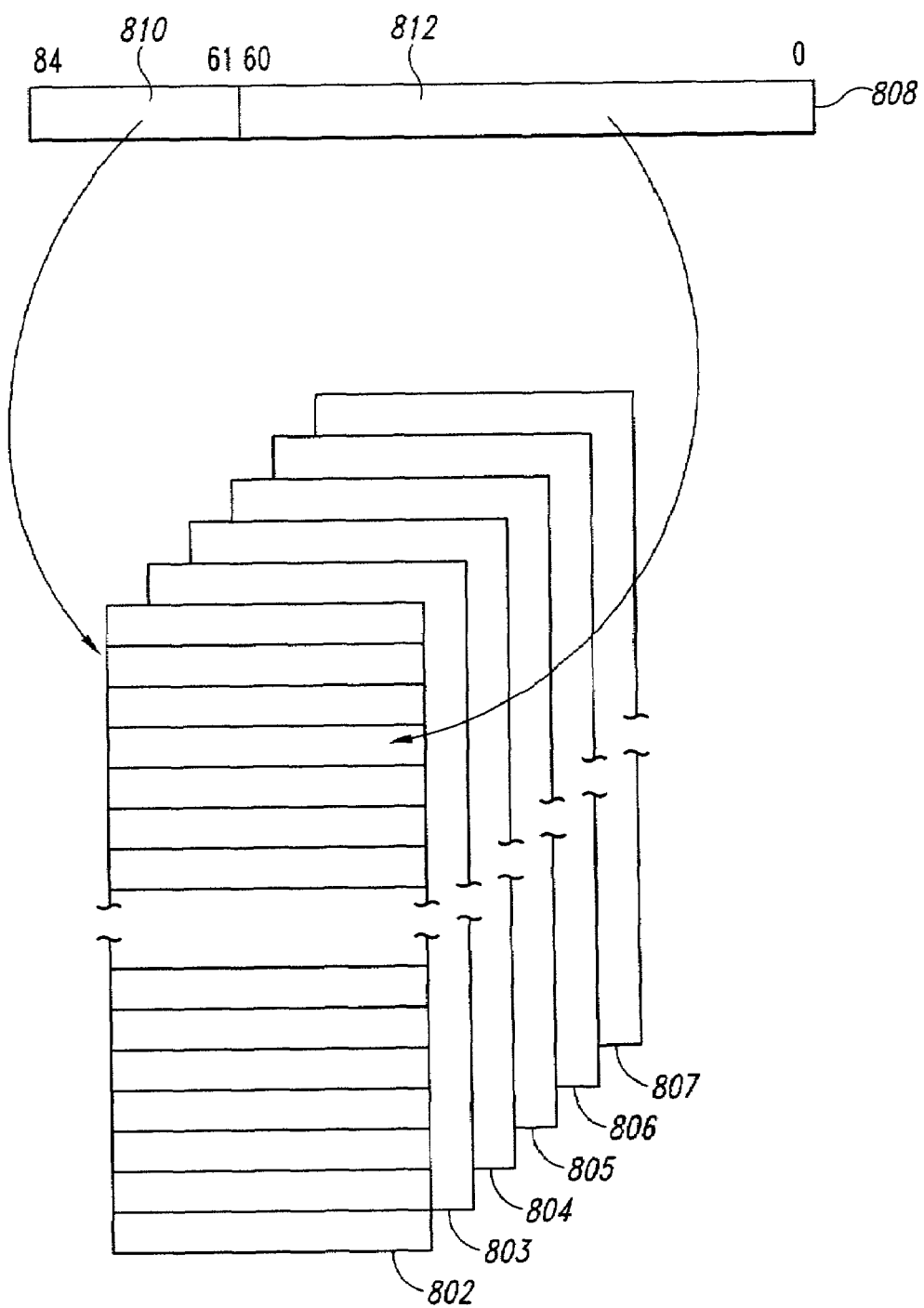
FIG. 8 illustrates the virtual address space provided by one modern computer architecture.

Processors built to comply with the Intel® IA-64 computer architecture represent one fundamental hardware interface of a series of modern computer hardware platforms suitable for combination with a secure platform software layer to produce the combined-hardware-and-software secure-platform interface that represents one embodiment of the present invention. FIG. 7 is a block diagram showing the registers within one modern processor. The registers hold values that define the execution state of the processor, and, when saved to memory, capture the state of an executing process prior to stopping execution of the process. Restoring certain registers saved in memory allows for resumption of execution of an interrupted process. The register set shown in FIG. 7 is quite complex, and only certain of the more important registers are described, below.

One important register is the process status register ("PSR") 702. The PSR is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The highest privilege level is privilege level 0. The lowest privilege level is privilege level 3. Only processes executing at privilege level 0 are allowed to access and manipulate certain machine resources, including the subset of registers, known as the "system-register set," shown in FIG. 7 within the lower rectangle 704. These system registers include a set of region registers 706, a set of protection-key registers 708, data and instruction translation look aside buffer registers 710, a set of debug-breakpoint registers 712, a set of performance-monitor-configuration registers 714, and a set of control registers 716. One control register, the interruption processor status register ("IPSR") 718, stores the value of the PSR for the most recently interrupted process. The interruption status register ("ISR") 720 contains a number of fields that indicate the nature of the interruption that most recently occurred. Other control registers store information related to other events, such as virtual memory address translation information related to a virtual address translation fault, pointers to the last successfully executed instruction bundle, and other such information. Sets of external control interrupt registers 722 are used, in part, to set interrupt vectors.

The registers shown in FIG. 7 in the upper rectangular region 724 are known as the "application-register set."

These registers include a set of general registers 726, sixteen of which 728 are banked in order to provide immediate registers for interruption handling code. At least 96 general registers 730 form a general-register stack, portions of which may be automatically stored and retrieved from backing memory to facilitate linkages among calling and called software routines. The application-register set also includes floating point registers 732, predicate registers 734, branch registers 736, an instruction pointer 738, a current frame marker 740, a user mask 742, performance monitor data registers 744, processor identifiers 746, an advanced load address table 748, and a set of specific application registers 750.

The IA-64 architecture provides a 2-bit privilege-level field in the processor status register, in turn providing for 4 privilege levels: PL0—the most privileged, kernel privilege level; PL1—the next most privileged privilege level; PL2—the next most privileged level; and PL3—the application-level privilege level.

The memory and virtual-address-translation architecture of the IA-64 computer architecture is described below, with references to FIGS. 8–11. The virtual address space defined within the Intel IA-64 computer architecture includes $2^{24}$ regions, such as regions 802–807 shown in FIG. 8, each containing $2^{61}$ bytes that are contiguously addressed by successive virtual memory addresses. Thus, the virtual memory address space can be considered to span a total address space of $2^{85}$ bytes of memory. An 85-byte virtual memory address 808 can then be considered to comprise a 24-bit region field 810 and a 61-bit address field 812.

Figure 9:
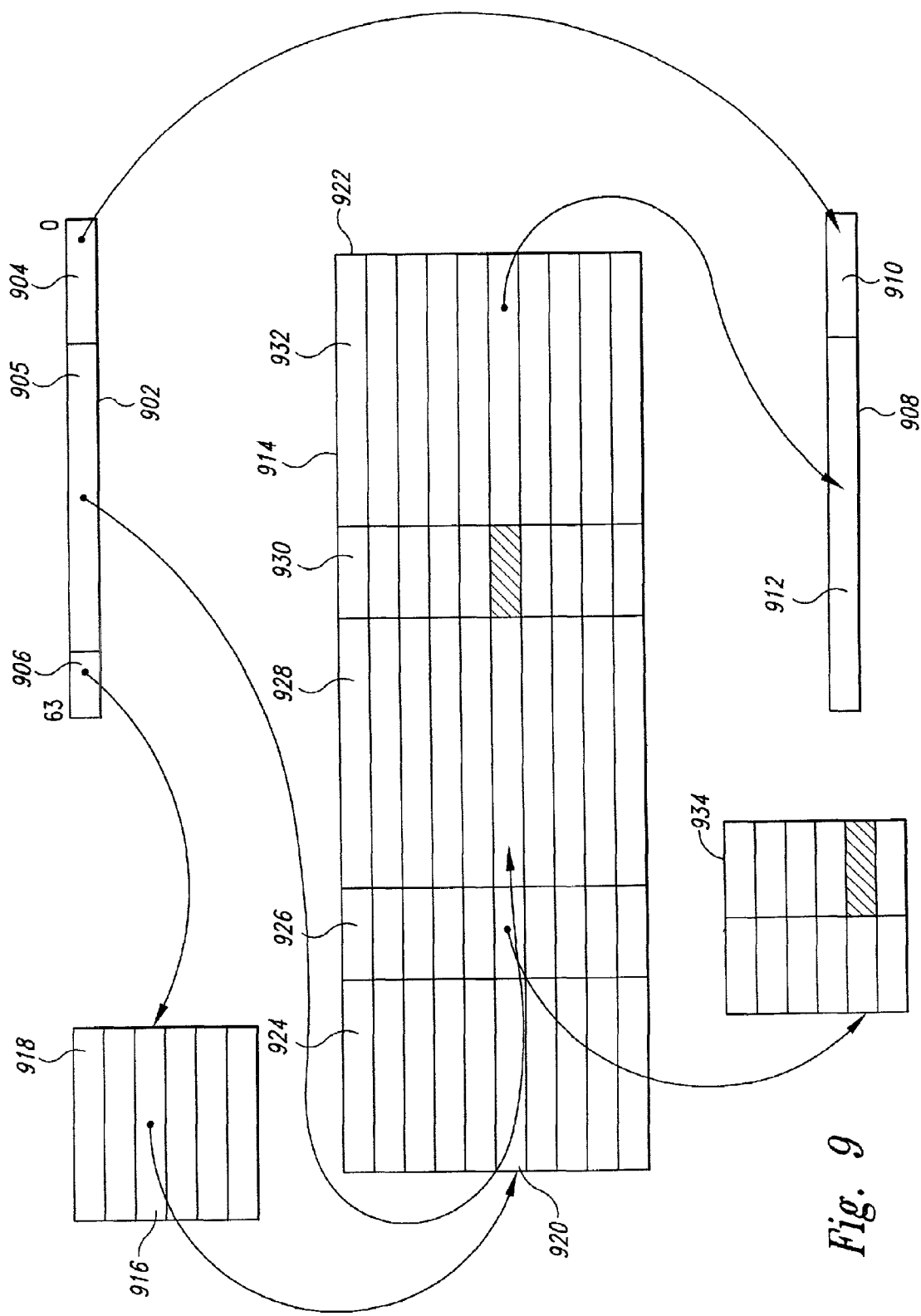
FIG. 9 illustrates translation of a virtual memory address into a physical memory address via information stored within region registers, protection key registers, and a translation look-aside buffer.

In general, however, virtual memory addresses are encoded as 64-bit quantities. FIG. 9 illustrates translation of a 64-bit virtual memory address into a physical memory address via information stored within region registers, protection key registers, and a translation look-aside buffer ("TLB"). In the Intel® IA-64 architecture, virtual addresses are 64-bit computer words, represented in FIG. 9 by a 64-bit quantity 902 divided into three fields 904–906. The first two fields 904 and 905 have sizes that depend on the size of a memory page, which can be adjusted within a range of memory page sizes. The first field 904 is referred to as the "offset." The offset is an integer designating a byte within a memory page. If, for example, a memory page contains 4096 bytes, then the offset needs to contain 12 bits to represent the values 0–4095 in the binary number system. The second field 905 contains a virtual page address. The virtual page address designates a memory page within a virtual address space that is mapped to physical memory, and further backed up by memory pages stored on mass storage devices, such as disks. The third field 906 is a three-bit field that designates a region register containing the identifier of a region of virtual memory in which the virtual memory page specified by the virtual page address 905 is contained.

Translation of the virtual memory address 902 to a physical memory address 908 that includes the same offset 910 as the offset 904 in the virtual memory address, as well as a physical page number 912 that references a page in the physical memory components of the computer system, is carried out by the processor, at times in combination with kernel and operating system routines. If a translation from a virtual memory address to a physical memory address is contained within the TLB 914, then the virtual-memory-address-to-physical-memory-address translation can be entirely carried out by the processor without operating system intervention. The processor employs the region register selector field 906 to select a register 916 within a set of region registers 918. The selected region register 916 contains a 24-bit region identifier. The processor uses the region identifier contained in the selected region register and the virtual page address 905 together in a hardware function to select a TLB entry 920 containing a region identifier and virtual memory address that match the region identifier contained in the selected region register 916 and the virtual page address 905. Each TLB entry, such as TLB entry 922, contains fields that include a region identifier 924, a protection key associated with the memory page described by the TLB entry 926, a virtual page address 928, privilege and access mode fields that together compose an access rights field 930, and a physical memory page address 932.

If an entry in the TLB can be found that contains the region identifier contained within the region register specified by the region register selector field of the virtual memory address, and that contains the virtual page address specified within the virtual memory address, then the processor determines whether the virtual memory page described by the virtual memory address can be accessed by the currently executing process. The currently executing process may access the memory page if the access rights within the TLB entry allow the memory page to be accessed by the currently executing process and if the protection key within the TLB entry can be found within the protection key registers 934 in association with an access mode that allows the currently executing process access to the memory page. The access rights contained within a TLB entry include a 3-bit access mode field that indicates one, of a combination of, read, write, and execute privileges, and a 2-bit privilege level field that specifies the privilege level needed by an accessing process. Each protection key register contains a 24-bit protection key associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware attempts to locate the correct TLB entry from an architected mapping control table, called the VHPT, located in kernel memory. If the hardware is unable to locate the correct TLB entry from the mapping control table, a TLB fault occurs and a kernel or operating system routine is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the process does not find a valid protection key within the protection key registers 934, or if the attempted access by the currently executing process is not compatible with the access mode in the TLB entry or the read/write/execute bits within the protection key in the protection key register, or the privilege level at which the currently executing process executes is less than the privilege level needed by the TLB entry, then a fault occurs that is handled by a kernel routine that dispatches execution to an operating system routine.

Figure 10:
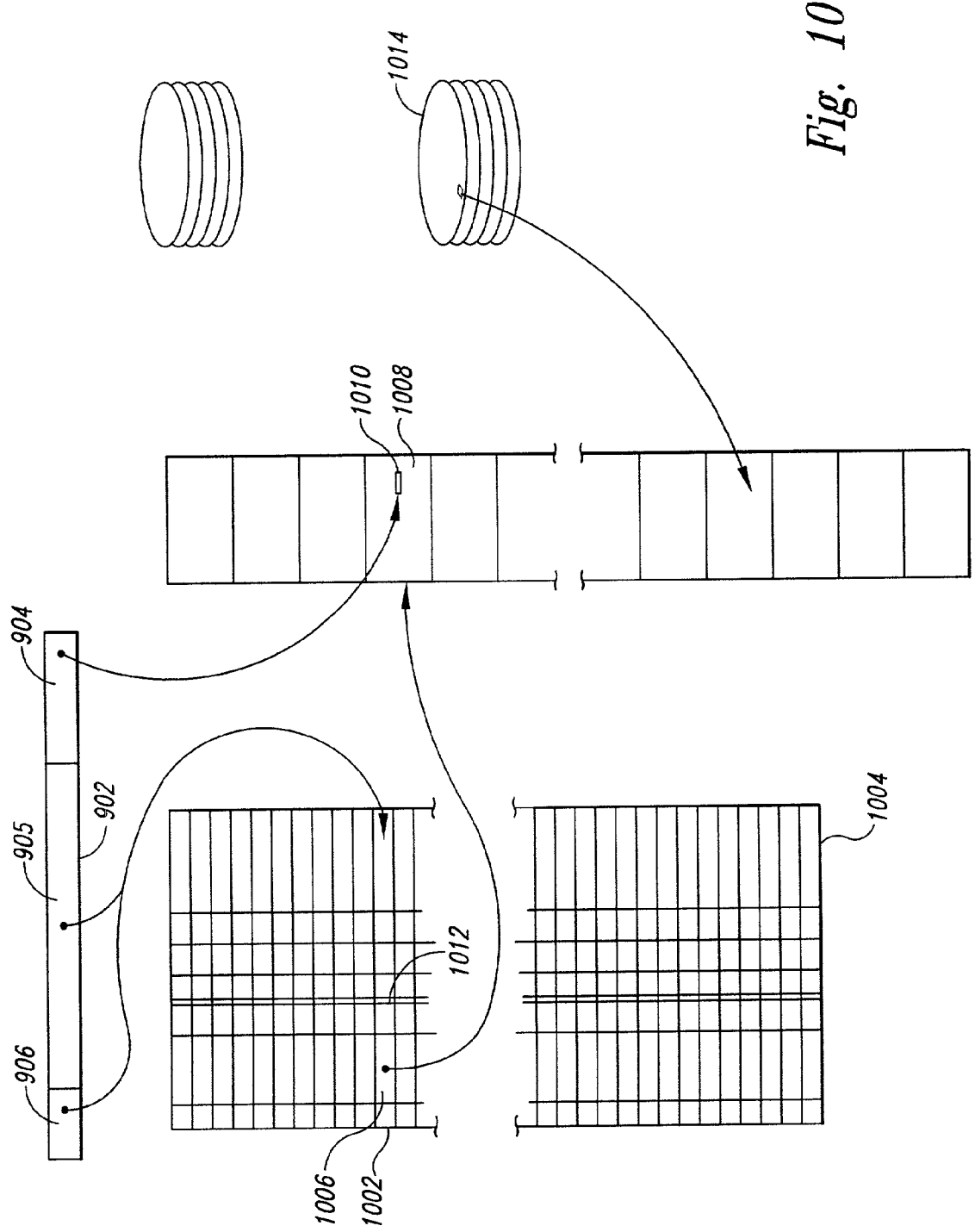
FIG. 10 shows the data structures employed by an operating system routine to find a memory page in physical memory corresponding to a virtual memory address.

FIG. 10 shows one form of a data structure employed by an operating system routine to find a memory page in physical memory corresponding to a virtual memory address. The virtual memory address 902 is shown in FIG. 10 with the same fields and numerical labels as in FIG. 9. The operating system routine employs the region selector field 906 and the virtual page address 905 to select an entry 1002 within a virtual page table 1004. The virtual page table entry 1002 includes a physical page address 1006 that references a page 1008 in physical memory. The offset 904 of the virtual memory address is used to select the appropriate byte location 1010 in the virtual memory page 1008. The virtual page table 1002 includes a bit field 1012 indicating whether or not the physical address is valid. If the physical address is not valid, then the operating system selects a memory page within physical memory to contain the memory page, and retrieves the contents of the memory page from an external storage device, such as a disk drive 1014. The virtual page table entry 1002 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 11 shows the access rights encoding used in a TLB entry. Access rights comprise a 3-bit TLB.ar mode field 1102 that specifies read, write, execute, and combination access rights, and a 2-bit TLB.pl privilege level field 1104 that specifies the privilege level associated with a memory page. In FIG. 11, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by routines running at any privilege level, shown in FIG. 11 by the letter "R" in the column corresponding to each privilege level 1106–1109, while a memory page described by a TLB entry with TLB.ar equal to 0 and TLB.pl equal to 0 can be accessed by reading only by a process running at privilege level 0, as indicated in FIG. 11 by the letter "R" 1110 under the column corresponding to privilege level 0. The access rights described in FIG. 11 nest by privilege level according to the previous discussion with reference to FIG. 4. In general, a process running at a particular privilege level may access a memory page associated with that privilege level and all lower privilege levels. Using only the access rights contained in a TLB entry, it is not possible to create a memory region accessible to a process running at level 3 and kernel routines running at level 0, but not accessible to an operating system routine running at privilege level 2. Any memory page accessible to a routine running at privilege level 3 is also accessible to an operating system routine executing at privilege level 2.

Because computer resources are partitioned according to privilege levels, processes generally access instructions and data from memory pages associated with the privilege level of the executing process or a lower privilege level, with privilege level 0 considered the highest privilege level. An executing process may be interrupted by a hardware-generated interruption, in which case an interruption handling routine is automatically invoked by the hardware to execute at privilege level 0. Once the interruption is partially or completely handled, the interruption handling routine may execute a return from interrupt ("rfi") instruction to return execution to the point of the previously executing routine at which the interrupt occurred, lowering the CPL back down to the CPL at which the previously executing routine had been executing prior to the interruption.

Figure 12:
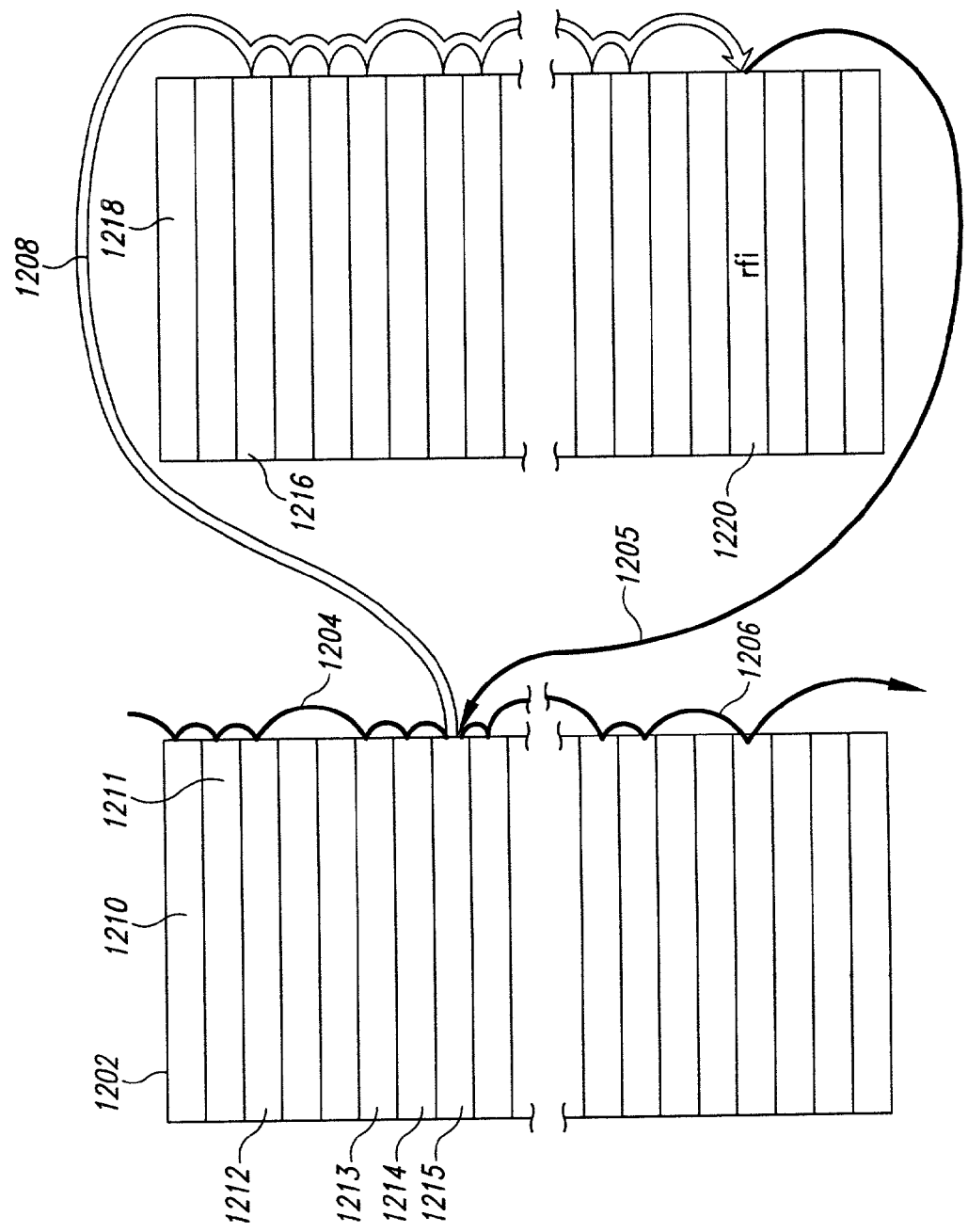
FIG. 12 illustrates the interrupt mechanism.

The interruption process is illustrated in FIG. 12. In FIG. 12, a process executing an application program executes instructions from a memory page 1202 associated with the low privilege level of an application-program process. Execution of instructions from the memory page is represented by the dark, or filled-in, curved arrows 1204–1206. Execution of the interruption-handling routine, at privilege level 0, is indicated in FIG. 12 by the light, or open, curved arrow 1208. Initially, the application-program process successively executes instructions stored at memory locations 1210–1215. During execution of the instruction stored in memory location 1215, a machine interruption occurs, invoking the privilege-level-0 interruption handler, which then begins executing an instruction stored at memory location 1216 within a memory page 1218 associated with privilege level 0. The interrupt handler executes a number of instructions before finally executing an rfi instruction stored at memory location 1220, causing the CPL to be demoted back to the low privilege level at which the application-program process had been executing prior to the occurrence of the interruption, and returning control to the application program as indicated by dark, or filled-in arrow 1205. The application program then resumes executing, as indicated by dark, or filled-in arrow 1206. For certain types of interruptions, the privilege-level-0 interrupt handler may execute entirely within the context of the interrupted process. In order to handle more complex interruptions, the operating system may store context information associated with the application-program process in the PCB associated with that process and prepare a new context in which the interruption handler can execute, restoring the application-program context when the application-program process is restored following handling of the interruption.

Figure 13:
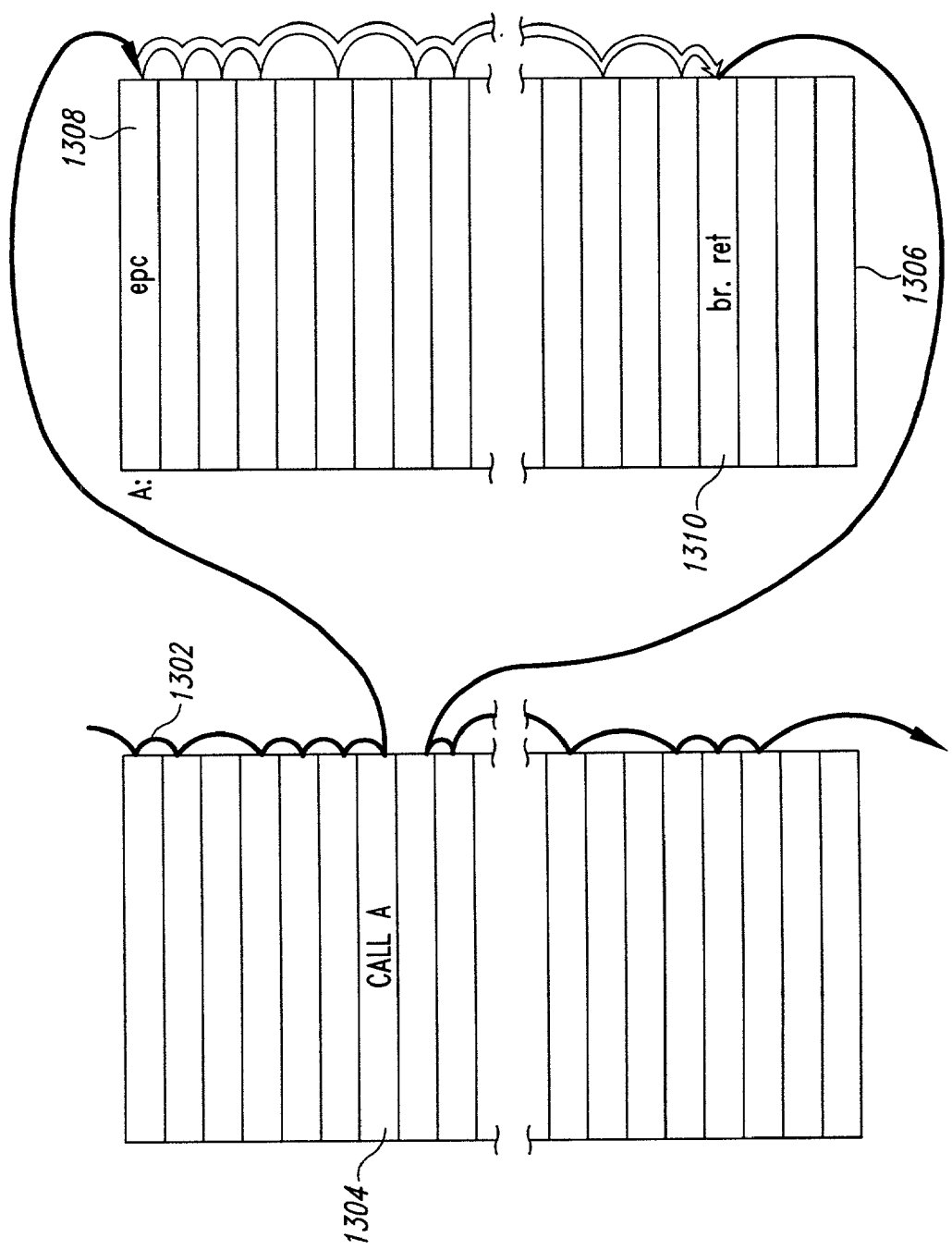
FIG. 13 illustrates a CPL-promotion mechanism that allows application-level routines to call higher-privilege-level routines.

There are cases when an application-program process needs to call an operating-system subroutine or function that runs at a privilege level higher than that of the application-program process. Because the PSR can be accessed and changed only by a privilege-level-0 routine, an application program executing at a lower privilege level cannot directly modify the CPL. One way to effect such a call is to execute a "break" instruction containing an encoded parameter. This instruction causes an interruption to privilege-level-0, and the parameter encoded in the break instruction can be decoded to send control to the desired privilege-level-0 function. However, the IA-64 computer architecture provides a faster mechanism by which an application-program process may invoke a privilege-level-0 process. FIG. 13 illustrates the CPL-promotion mechanism that allows application-level routines to call higher-privilege-level routines. FIG. 13 employs the same illustration conventions as employed in FIG. 12. The executing application program, represented by filled-in arrow 1302, executes a call instruction stored in memory location 1304 in order to call a higher-privilege-level routine "A." The higher-privilege-level routine is stored on a memory page 1306 associated with the higher privilege level. The higher-privilege-level routine initially executes an epc instruction, stored at memory location 1308, which promotes the CPL to the CPL associated with the memory page that includes the instruction. The called routine can then execute at the higher privilege level, finishing execution with a br.ret instruction 1310 that returns execution to the application-level program and automatically demotes the CPL back to the CPL at which the application-level program executed prior to the subroutine call. Note that this mechanism does not provide a means for an application program to promote the CPL and carry out unauthorized access to protected computer resources. Memory pages may only be associated with privilege levels only by instructions executing at privilege level 0. Thus, routines that employ the epc CPL-promotion instruction need to be initially set up by privilege-level-0 routines. Thus, an operating system may use the epc mechanism to safely create operating-system entry points callable from lower privilege-level routines.

Cryptography

There are six basic types of cryptographic techniques: (1) symmetric (secret) key encryption; (2) asymmetric (public/private) key encryption; (3) one-way hash functions; (4) message authentication codes; (5) digital signatures; and (6) random number generators.

Encryption/Decryption

Symmetric and asymmetric key encryption both are used to scramble data so completely that an attacker lacking the correct key is unable to determine the content or meaning of the original unscrambled data. The data itself can be any form of digitized information, including letters or numbers of any language, special symbols for words or punctuation or control, or video and audio images.

The process of scrambling the data is called "encrypting," or "enciphering" the data. The reverse operation, to unscramble the data back to its original form, is called "decrypting," or "deciphering" the data. The original unscrambled data is called "clear text." The scrambled data is called "cipher text." There are many different algorithms for encrypting and decrypting. Encryption and decryption algorithms generally take two input arguments, and produce as output the encrypted or decrypted data, respectively. The first input argument is the data to be encrypted or decrypted. The second input argument is called the "key." Best practice deems the secrecy of an encryption and decryption scheme to inhere solely in the key. Encryption and decryption can be concisely described as follows:

Cipher-text=Encrypt(Clear-text, Encrypt-key)

Clear-text=Decrypt(Cipher-text, Decrypt-key)

Symmetric Key Encryption

For symmetric key encryption, both the sender and receiver of encrypted messages employ the same secret key. For example, if the secret key were the word "applesauce", the equations would be:

Cipher-text=Encrypt(Clear-text, "applesauce")

Clear-text=Decrypt(Cipher-text, "applesauce")

Keys normally used are long, randomized bit strings. The lengths of keys are determined by the specific symmetric cipher. The binary values of keys are generated by processes that are constructed to insure that the values are sufficiently unpredictable.

Symmetric ciphers are of two basic types: (1) block ciphers; and (2) stream ciphers. A block cipher encrypts or decrypts a single, fixed-size block at a time. The size of a block is defined by the specific block cipher. A streaming cipher generates a sequence of binary values that are XORed with the Clear-text to encrypt, or with the Cipher-text to decrypt. The size of each binary value generated by a stream cipher is defined by the specific stream cipher.

Symmetric key encryption executes at high speed. On grounds of security and performance, symmetric ciphers rank very highly. For any confidential, high-volume data interchange, symmetric key cryptography is the preferred choice, because of its high performance. The hard problem for deploying symmetric cryptography is the distribution and management of secret keys, aptly named the "Key Distribution Problem."

The Key Distribution Problem, i.e. the definition of a process securely to distribute unique secret keys throughout a network, to every pair of persons or programs that needs to communicate in confidence, is very complex. Entire systems have been built solely to perform this function. One system developed dedicates entire servers simply to the task of being trusted third parties for distribution of secret keys.

Asymmetric Key Encryption

For asymmetric key encryption, the key used to encrypt data is a different key from that used to decrypt data. Unlike symmetric key encryption, which uses the same secret key both for encryption and decryption, asymmetric key encryption uses two different keys. The advantage of asymmetric key encryption is that only one of the keys needs to be kept private (i.e. secret). The other key can be widely known, i.e. can be made public. It is for this reason that asymmetric key encryption popularly is called "public/private" key encryption. Asymmetric ciphers greatly ameliorate problems of key distribution. Symbolically:

Cipher-text=Encrypt(Plain-text, public-key)

Plain-text=Decrypt(Cipher-text, private-key)

The most widely used asymmetric cipher is called "RSA," an acronym composed of the first letters of the last names of its inventors. RSA operates upon very large integers modulo the product of two secret prime numbers. RSA public and private keys each are pairs of such large integers. For good security today, 1024 to 2048 bit integers are used, although some applications continue to use 512 bit integers. The cryptographic strength of RSA derives from the difficulty in factoring the product into the two secret primes.

More recent work has shown that finite groups of points lying on an "elliptic curve" provide a perhaps stronger base than RSA for asymmetric cryptography. The security of the schemes based upon elliptic curves derives from the difficulty in solving the discrete log problem over elliptic curves. (For details, see: Blake, Seroussi, Smart, *Elliptic Curves in Cryptography*, Cambridge Univ. Press, 1999.) The keys needed for computations are shorter than those needed for RSA. The elliptic curve key equivalent in strength to a 1024-bit RSA key, for example, would be fewer than 200 bits in length. The computations, however, are more complex than those for RSA. The primary disadvantage of asymmetric encryption is that it needs much, much more computation. In other words, asymmetric encryption is significantly slower than symmetric encryption. Because of the relative strengths and weaknesses of symmetric and asymmetric cryptography, a usual practice is to use asymmetric key cryptography for key distribution, and symmetric key cryptography for the bulk of the transferred data.

One-Way Hash Functions

One-way hash functions are algorithms that transform an arbitrary input bit stream into a fixed-size result. They are called "one-way" because, while it is straightforward to perform the hash function, it is provably impossible to compute the inverse of the hash function—that is, to compute the input bit stream given only the fixed-size hash function output.

Further, secure hash functions are designed so that, to the extent possible, the value of every bit of the output of the function is affected by the value of every bit of the input, and that for a given hash output value it is a prohibitively difficult task to find another input bit stream that would produce the identical hash function output. These properties of secure hash functions permit one reasonably to use the hash output value as an identifying "signature" or "digest" for the input bit stream. Hash function outputs are like digital fingerprints of the input bit stream.

Secure hash functions typically operate in two phases. First, the arbitrary-length input bit stream is padded in a specific manner to a multiple of a fixed block size. Usually, the bit length of the entire input stream appears as the final 64-bit value in the last 64-bit double word of the final pad block. Second, the padded input is processed a block at a time by the hash function, using output values from each block as initial input values to the processing of the next block. The combined result after processing the final block is the output of the hash function. Symbolically:

Message-Digest=Hash-Function(Pad-Function(Message-Input-Bits))

Hash functions are one of the most versatile and widely employed cryptographic tools. They are used in nearly every Internet protocol. Whenever it is necessary logically to associate a number of elements, a common practice is to concatenate the byte-strings representing the elements and hash the total result. This produces a digital fingerprint reflecting every element as well as the entire, ordered association. Hash values of documents, data structures, and code images are crucial for digital signatures.

Message Authentication Codes

Message Authentication Codes ("MACs") are designed to protect the authentication and integrity of messages and data rather than to protect their confidentiality. A MAC is a value appended to a message or data that permits one to assure that the content of the message or data has not been modified in any way.

MACs, like symmetric key encryption, use a secret key. If it is not important to protect the content of a message, but only to insure its integrity, the secret key is used to compute a MAC, which then is appended to the message. Any party who knows the secret key can recalculate the MAC from the received message, and compare the newly calculated value with the MAC appended to the received message. If the newly computed and transmitted values match, the message has been transmitted correctly.

MACs are used in secure IP ("IPSec") to assure that packet contents have not been modified during transmission. They also are used in transfer protocols between banks to authenticate messages. MACs also can be attached to data stored in files or databases. In all cases any one knowing the secret key can verify that the data over which the MAC was calculated has not been altered. Computations of MACs utilize symmetric key encryption over the data, or sometimes over secure hashes of the data.

Digital Signatures

Digital signatures are similar to MACs in providing a guarantee of the integrity of stored or transmitted data. But digital signatures differ from MACs with respect to the secrets employed and the distribution of those secrets.

For MACs there is a non-empty set of persons who know the secret key used to compute the MAC. Any of the people in the set can verify a MAC computed with the secret key. At the same time, any of these persons also can compute a MAC for different messages or data, or can forge a MAC for an altered message or data. All the persons who know the secret need to trust each other—both to keep the secret key secret and to employ the secret key properly.

MACs work well when there is but a single individual who holds the secret. This person can use the secret to protect his or her data and to assure its integrity. MACs also work well for sets of two persons. These folks trust each other not to reveal the secret, and can send messages back and forth knowing that the integrity of each message has not been compromised. These models fit many important situations.

Digital signatures are an integrity protection mechanism where there is but a single party who is capable of constructing the signature, but everyone then is able to verify the signature. In this model, one specified party, the sole holder of the enabling secret, becomes responsible for computing and appending the signature to the data. This is called "signing" the data. After the data has been signed, anyone can verify that the specified party, more exactly, the specified secret key, in fact did compute the signature. This model fits many important commercial and practical situations.

Digital signatures are computed by using a remarkable property of asymmetric key cryptography. Namely, digital signatures also work in reverse. In the previous section on asymmetric key cryptography we wrote symbolically:

Cipher-text=Encrypt(Plain-text, public-key)

Plain-text=Decrypt(Cipher-text, private-key)

But it turns out that the keys can be used in the reverse order, namely:

Cipher-text=Encrypt(Plain-text, private-key)

Plain-text=Decrypt(Cipher-text, public-key)

In the first case the owner of the secret key does the decrypting, and anyone can do the encrypting. In the latter case, the owner of the secret does the encrypting, and anyone can do the decrypting. The latter case is used for digital signatures.

Digital signatures can be used by themselves, or in combination with encryption designed to protect confidentiality. Often, it is not important that the data contents are confidential, but it is extremely important that the data are accurate. Digital signatures are not computed by encrypting all of the data with the private key, but rather are computed by using a private key to encrypt a secure hash of the data. In effect, we first take a digital fingerprint of the data, and then encrypt the digital fingerprint with the private key. Symbolically:

Digital-Signature=Encrypt(Hash-Function(Message-Input-Bits), private-key)

Digital-Fingerprint=Decrypt(Digital-Signature, public-key)

Digital signatures also are verified in two steps. First the digital fingerprint of the data contents is recomputed using the hash function. Then the appended digital signature is decrypted using the public key. If the recomputed digital fingerprint and the decrypted digital signature match, the signature has been verified.

Random Number Generators

Random numbers are employed throughout cryptographic algorithms and protocols. They are used for keys, challenge values, nonces, pre-hashing appendages for passwords, etc. Hardware devices based upon some form of physical randomness are beginning to appear. The problem with such hardware devices, of course, is testing them to assure they're operating correctly. Computational means exist for computing numbers that are sufficiently unpredictable that they can be used in lieu of truly random numbers. Such numbers are called "Pseudo-Random Numbers" ("PRNs"). Some of the pseudo-random number generation methods employ values based upon physical measurements of random events in a computer system, such as typing rates, arbitrary mouse motions, arrival times of disk I/O interrupts, etc. Others are based upon symmetric cryptography or the difficulty of hard mathematical problems such as the factoring problem. Pseudo random number generators ("PRNGs") that produce sufficiently unpredictable values are called "Cryptographically Strong Pseudo Random Number Generators" ("CSPRNGs").

The Secure-Platform Kernel Embodiment of the Present Invention

Figure 6:
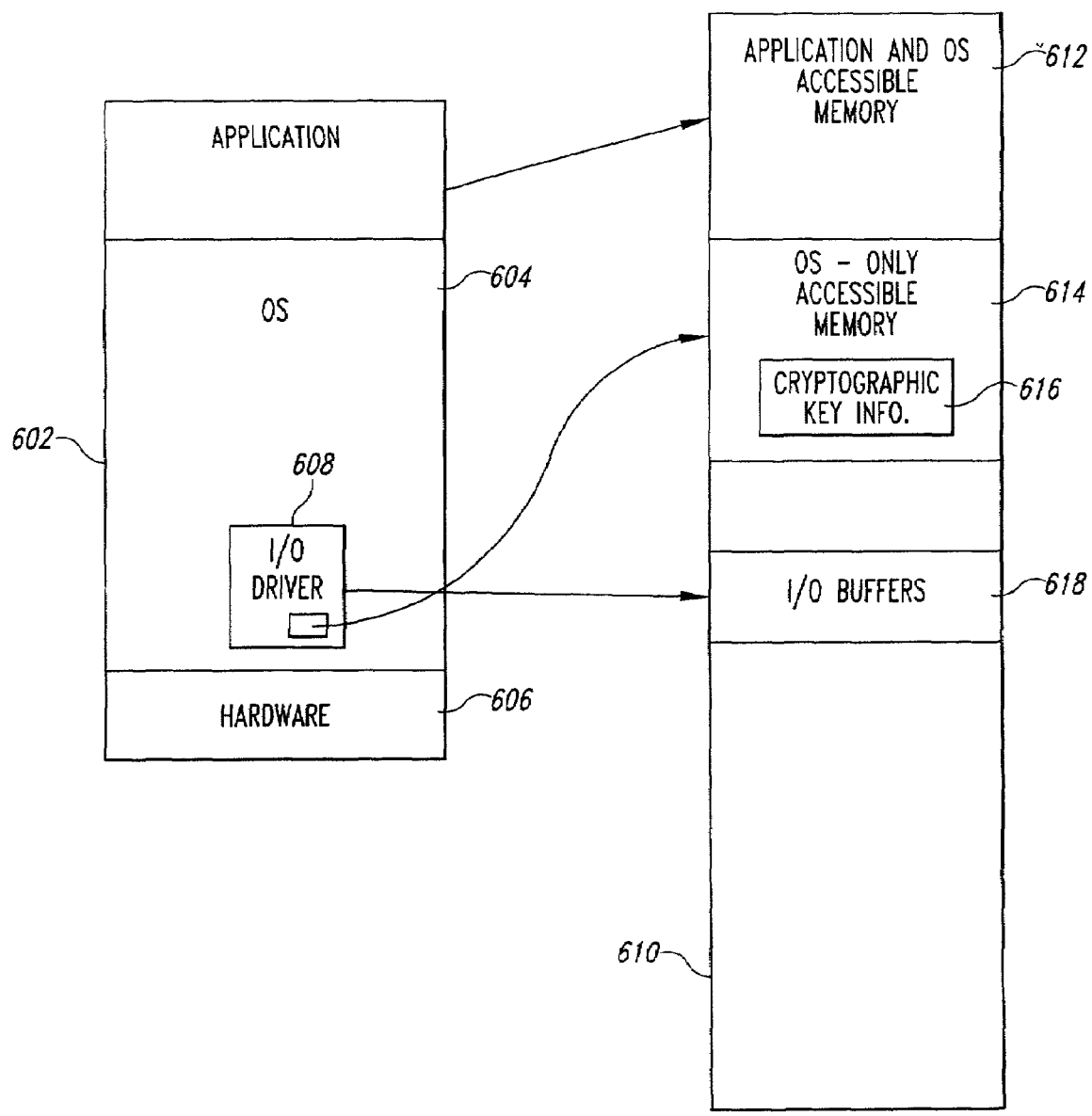
FIG. 6 illustrates one example of a security and reliability breach present in many modern computer systems.
Figure 14:
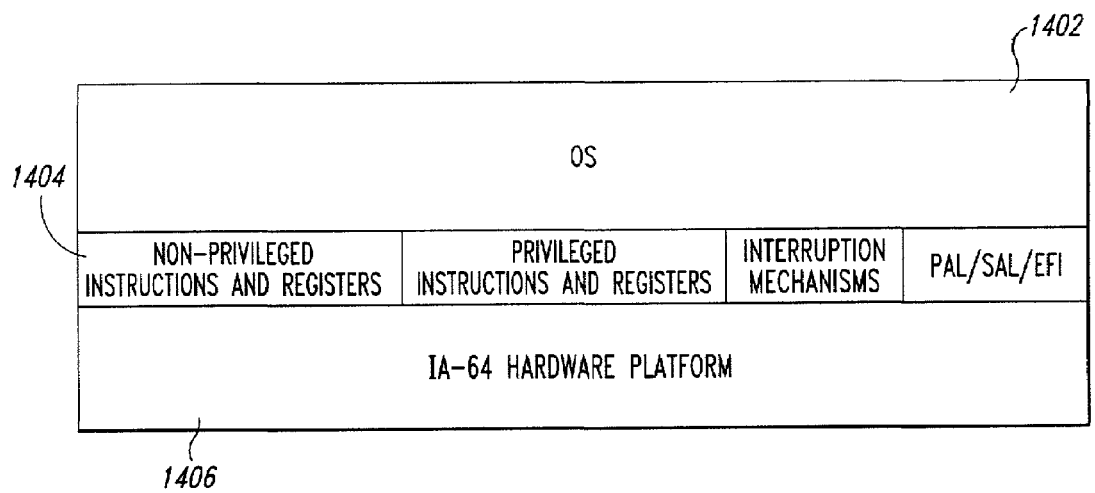
FIG. 14 illustrates layering of an operating system directly on an IA-64 processor-based machine.

FIG. 14 illustrates layering of an operating system directly on an IA-64 processor-based machine. The operating system 1402, in this direct layering approach, uses the IA-64 architecture-specified interface 1404 provided by the IA-64 processor-based machine 1406 as the computing resources to manage and to parcel out to application programs via operating system services. The IA-64 architecture-specified interface 1404 comprises non-privileged and privileged instructions and registers, hardware interruption mechanisms, and firmware interfaces. However, by employing a direct layering of the operating system onto the IA-64 hardware interface, the many security problems and deficiencies inherent in current operating systems cannot be easily addressed using features of the IA-64 architecture. As one example, should I/O drivers continue to be incorporated within the operating system and executed at PL0, the problem illustrated in FIG. 6 would remain a potential vulnerability for the computer system. Operating systems are relatively large programs, and in practice impossible to verify for correctness and secure operation.

Figure 1:
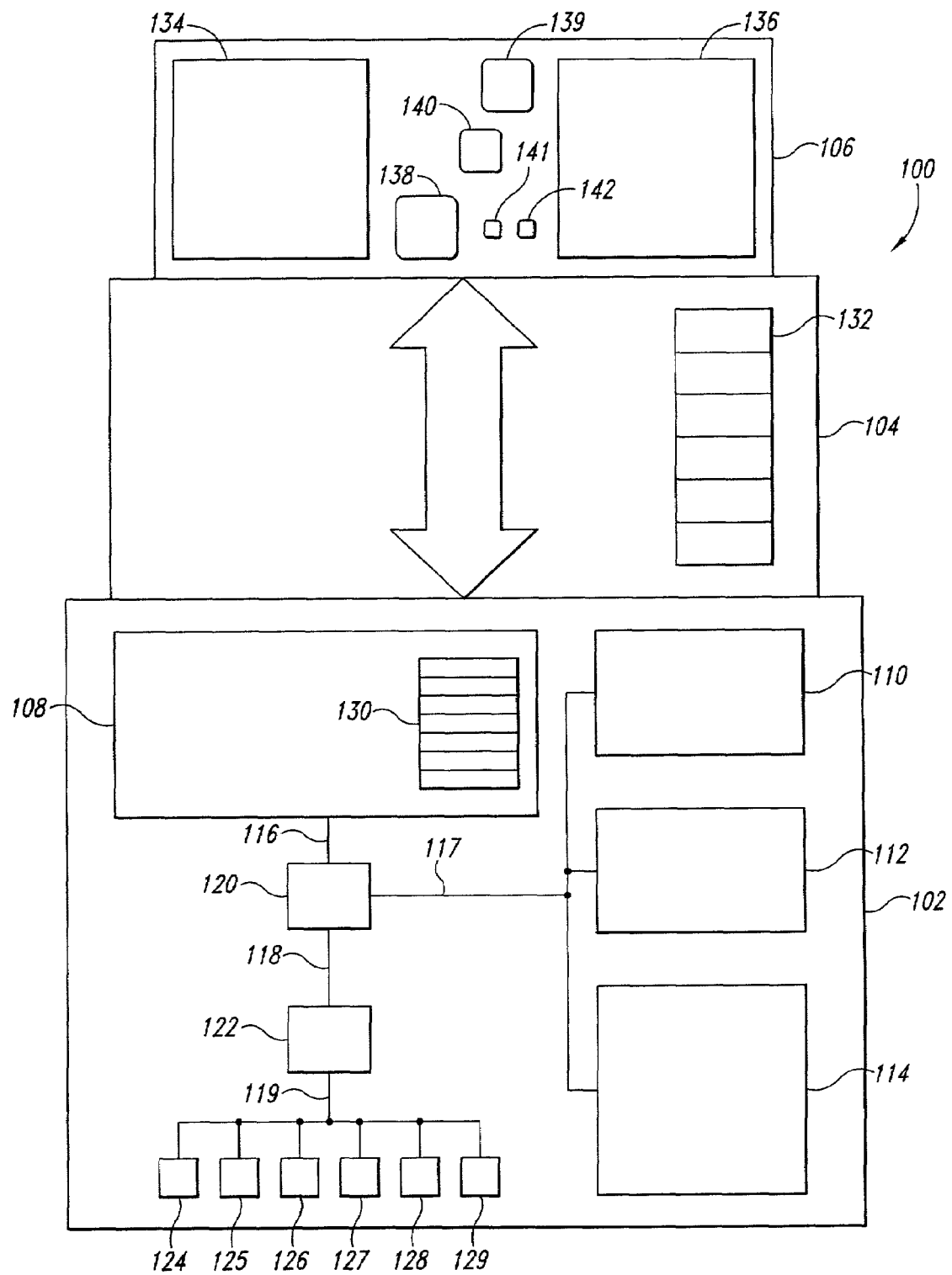
FIG. 1 is a block diagram showing hardware, operating-system, and application-program layers within a generalized computer system.

One embodiment of the present invention is a combined-hardware-and-software secure-platform interface that provides a secure layer that interfaces with one or more computer operating systems and customized control programs. The combined-hardware-and-software secure platform ("SP") allows an operating system or customized control program to directly access, via a combined-hardware-and-software secure-platform interface ("SPI"), non-privileged machine instructions and registers as well as to invoke software routines that provide control of the hardware to an operating system or customized control program without exposing the privileged machine instructions and registers. In addition, the SP and SPI provide a set of secure repository services that include, among other things, encryption and decryption services, security policy management, and other security-related services that employ internally generated, secret data, such as encryption keys in the clear, that cannot be exposed to the operating systems and customized control programs, nor to other routines of the software portion of the combined-hardware-and-software secure platform. The SPI can be thought of as a machine interface to a machine that includes not only hardware, including one or more processors, busses, memory components, and other hardware components shown in FIG. 1, but also firmware interfaces and an extensible set of software routines. Thus, the SPI is an interface to the SP, a composite hardware, firmware, and software machine. The SPI also can be thought of as an interface provided by a new type of software layer underlying operating systems and customized control programs.

Figure 15:
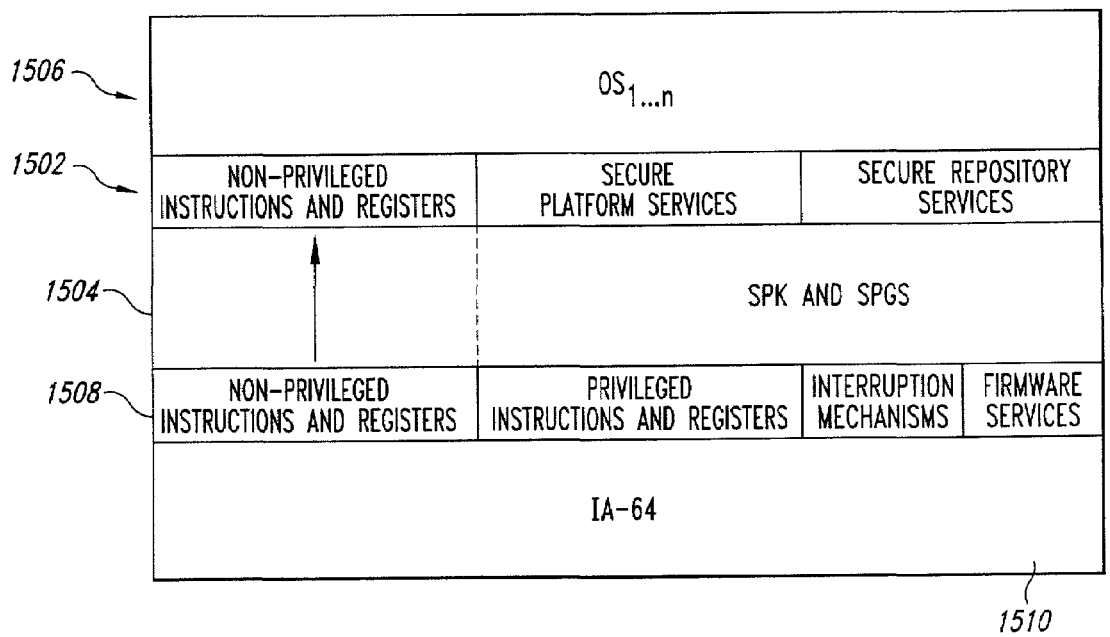
FIG. 15 is a block diagram illustrating the SP interfaces within a computer system comprising a combined-hardware-and-software secure platform and one or more operating systems and customized control programs.

FIG. 15 is a block diagram illustrating the SP within a computer system comprising the SP and one or more operating systems and customized control programs. The SPI 1502 lies between the software layer 1504 of the SP and one or more operating systems and/or customized control programs 1506. The SP comprises the software layer 1504, a hardware and firmware platform interface 1508, and the hardware and firmware platform 1510. As discussed above, the non-privileged instructions and registers provided at the hardware interface 1508 are directly exposed by the SPI 1502, as indicated in FIG. 15 by vertical arrow 1512. The other components of the hardware interface, to the right of the vertical dashed line 1514, are not exposed. Instead, functionality provided through these hardware-interface components is made available to operating systems and customized control programs via the secure-platform-services component 1516 and secure-repository-services component 1518 of the SPI.

It is important to emphasize, in addition to the capabilities that SP provides, that the SP is quite different from an operating system or a traditional virtual machine, and the SPI is different from an operating-system interface or virtual-machine interface. A virtual machine is a software abstraction of an underlying hardware platform that either directly exposes or simulates the privileged instructions and registers and firmware interfaces of the underlying hardware platform. Virtual machines are useful in a number of situations, such as operating system development. But the SP is unlike a virtual machine interface. The SPI deliberately prevents all access to privileged instructions and registers and firmware interfaces by overlying operating systems. Moreover, the SP mechanisms provide an extensible, rich set of secure services, such as cryptographic services, that extend well beyond the scope of capabilities provided by virtual machines. SP secure services are made secure by completely compartmentalizing and isolating their code images and data from overlying operating systems and custom control programs. This compartmentalization and isolation is possible only because operating systems and custom control programs have no direct access whatsoever to privileged instructions and registers and firmware interfaces. SP encryption services, for example, are thus able to completely conceal actual values of encryption keys, and keying materials derived from encryption keys, from all operating systems, custom control programs, and application programs, while still allowing those operating systems, custom control programs, and application programs freely to employ the encryption services.

While the SP is a secure platform for operating systems, the SP does not, by itself, ensure the security of a computer system that is built upon the SP. Unlike a system control program, such as an operating system, the SP provides solely a set of callable mechanisms in addition unprivileged instructions and registers. The SP mechanisms provide basic building blocks from which a secure system can be constructed, as described below. The SP mechanisms allow an operating system to exercise sufficient control over the underlying hardware to provide full operating system services to application programs and users. But the SPI provides this functionality without exposing any privileged instructions or registers or firmware interfaces to an overlying operating system or custom control program. Internally, in the IA-64 embodiment of the invention, the SP mechanisms consistently utilize the protection capabilities of the IA-64 architecture in a manner designed to reduce vulnerabilities to virus and penetration attacks. The practices employed include: all executable code images are first validated by checking their digital signatures before they are set to be executable; executable code images never are permitted simultaneously to be both executable and writable; stacks and data areas may be read or written, but never executed; SP mechanisms are compartmentalized by the use of privilege levels and protection keys, to isolate the code and data of each mechanism from all overlying operating systems and custom control programs, and from all other SP mechanisms. Operating systems and custom control programs overlying the SP also can adopt similar memory protection practices to improve their security. But, indeed, any operating system or custom control program may fail to properly secure itself, despite being provided the tools to do so by the SP interface.

SP organizes the resources of the system into one or more disjoint, mutually isolated partitions, called "domains." Each domain operates under the control of an operating system or custom control program. SP allocates a range of virtual memory addresses, a range of physical memory addresses, a number of logical and physical CPUs, a set of I/O devices, and a set of identifier values to each domain. In order to provide the SP services, the SP software layer needs certain specific functionality from the SP hardware layer, in addition to the non-privileged instructions, registers, and other processor functionality generally provided by the hardware layer. A first, important additional functionality is provision of at least four privilege levels at which various processes can execute. The software layer of the SP reserves the two most privileged privilege levels, PL0 and PL1, for exclusive software-layer use, leaving at least a third privilege level, PL2, for operating system routines and custom control programs, and a fourth privilege level, PL3, for application programs. Hardware providing more than four privilege levels can also be used, with the additional privilege levels either not needed, or allocated to the operating-system layer for operating-system use. In one embodiment of the invention, the SP mechanisms that execute at PL0 are called the Secure Platform Kernel ("SPK"), and the SP code that executes at PL1 is called the Secure Platform Global Services ("SPGS"). The operating system or custom control program executing within a domain manages the logical and physical resources allocated to the domain by invoking the secure platform services. The domain operating system or custom control program operates at the highest privilege level above the SP interface, which is a lower privilege level than the operating privilege levels of SPGS and SPK.

Figure 16:
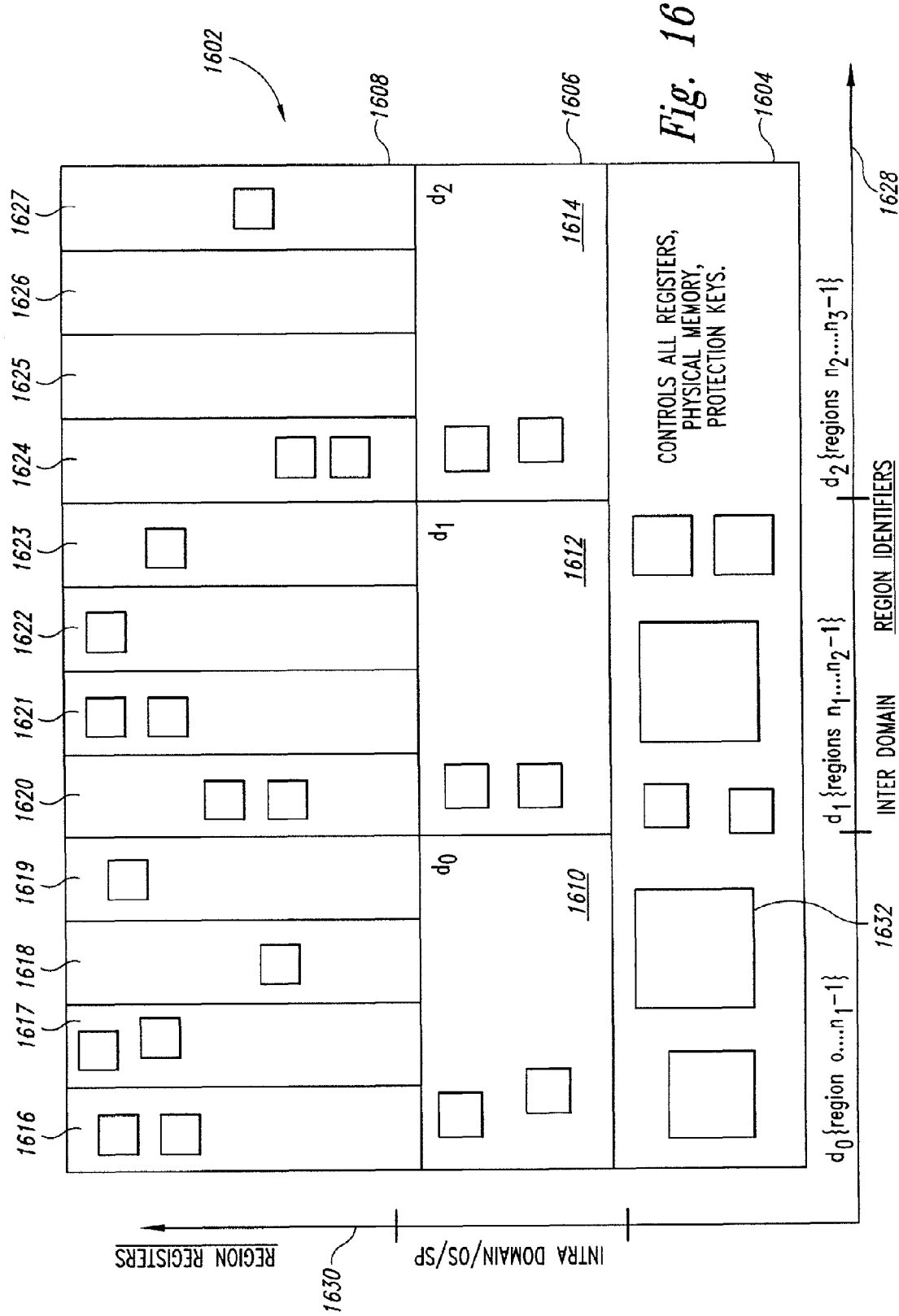
FIG. 16 illustrates the second memory-partitioning functionally needed by the SP and provided by modern processor architectures, such as the Intel® IA-64 processor architecture.

A second, important additional functionality is that at least two dimensions of memory-partitioning control be available to the SP for partitioning memory between operating-system-based domains and, within each domain, partitioning memory between the SP, an operating system, and user-level application-program processes. FIG. 16 illustrates the second memory-partitioning functionality needed by the SP and provided by modern processor architectures, such as the Intel® IA-64 processor architecture. In FIG. 16, the total virtual memory space is represented by a large rectangle 1602. A portion of the total virtual memory space 1604, shown as a horizontal rectangle spanning the entire horizontal extent of the large rectangle 1602, is accessible only to the software layer of the SP. A second portion of the entire virtual memory space, shown as a horizontal rectangle 1606 spanning the entire horizontal extent of the large rectangle 1602, is used within each domain by the operating system managing that domain. A third portion of the entire virtual memory space, shown as a horizontal rectangle 1608 spanning the entire horizontal extent of the large rectangle 1602, is used by individual application programs and other user-level processes within each domain. As discussed above, with reference to FIG. 9, privilege levels associated with memory pages in TLB entries allow for partitioning of memory between processes running at different privilege levels, but are not sufficient for the horizontal partitioning of domains and applications operating within each domain. Thus, the partitioning of memory within the horizontal SP, operating-system, and user-level partitions 1604, 1606, and 1608 can be partially accomplished using privilege-level-based partitioning of memory, provided that SP, operating-system, and user-level processes run at different privilege levels. However, privilege-level-based partitioning of memory cannot, for example, protect an area of memory allocated to a user-level process from access by an operating-system process.

The SP provides services to any number of concurrently running operating systems, each operating system managing any number of different user-level processes. In order to protect memory allocated to one operating system from access by another operating system, the operating-system memory space 1606 and the user-level memory space 1608 are further divided into domains. A single operating system and all user-level processes managed by that operating system together comprise a domain, and each domain is allocated a separate portion of virtual memory. Thus, in FIG. 16, a first operating system uses a first portion 1610 of the operating-system memory space 1606, a second operating system uses a second portion 1612 of the total operating-system memory space 1606, and a third operating system uses a third portion 1614 of the total operating-system memory space 1606. The user-level memory space 1608 is also divided into domains, so that, in FIG. 16, small portions of the virtual memory space 1616–1619 and the first portion of the operating-system memory space 1610 together compose the memory space allocated to a first domain, domain 0, user-level memory portions 1620–1623 and operating-system memory portion 1612 together compose the memory allocated to a second domain, domain 1, and user-level memory portions 1624–1627 and operating-system memory portion 1614 together compose the memory space allocated to a third domain, domain 2. Of course, in an actual computer system, the amount of memory allocated to a particular domain may differ from the amount of memory allocated to other domains, and different numbers of user processes may run within different domains.

In one embodiment of the present invention, the SP employs the region registers and region identifiers, described above with reference to FIG. 9, to partition memory with respect to domains. Thus, each operating system, and processes managed by the operating system, that together compose a domain are allocated a particular set of region identifiers for their exclusive use. As shown in FIG. 16, region-identifier-based memory partitioning can be thought of as one dimension 1628 of a two-dimensional memory partitioning mechanism.

The SP needs, in addition to the inter-domain, region-identifier-based memory partitioning, a second partitioning mechanism for partitioning memory within a domain between the operating system and user-level processes, as well as partitioning memory allocated to the SP from memory allocated to operating systems and user-level processes. In FIG. 16, this second partitioning mechanism is represented as a second dimension 1630 of memory partitioning. In the described embodiment of the SP, this second memory-partitioning dimension is provided by allocating a fixed number of region registers to contain the region identifiers for the SP software layer and the domain operating systems. The remaining region registers contain the region identifiers for each user-level process. The IA-64 protection keys provide an even finer granularity of compartmentalization throughout all of the memory areas 1604, 1606, and 1608. Protection keys, for example, are used to compartmentalize the mechanisms within the SPK layer. Because the SP controls all registers, physical memory, and protection keys, the SP can allocate physical memory and sets of region identifiers for exclusive use of each domain. Note that, by using protection-key-based memory partitions, a particular area of memory can in principle be allocated to any process for exclusive access by that process.

Thus, using horizontal partitioning of memory by region identifiers, and horizontal partitioning of memory by region registers, the memory protection mechanisms provided by the Intel® IA-64 architecture enable the SP to partition memory to provide areas of memory that can be exclusively accessed by only the SP, areas of memory that can be exclusively accessed only by the SP and one other operating-system or user-level entity, and areas of memory that can be accessed by a set of operating-system and user-level entities and the SP. The protection-key mechanisms provided by the Intel® IA-64 architecture provide even finer granularity. In current computer systems, the operating system, executing at privilege level 0, or any of the I/O drivers or other denizens that need to run at privilege-level 0, can manipulate state to gain access to all memory within a computer system. In an SP-based system using the two-dimensional memory partitioning scheme illustrated in FIG. 16, by contrast, the SP can provide memory areas accessible only to one of many concurrently running operating systems within the system, and memory areas accessible only to a particular user-level process. For example, in FIG. 16, the SP, by controlling allocation of protection keys, can allocate for itself a memory area, such as memory area 1632, that only a particular SP mechanism can access. Such an SP-mechanism-exclusive area is used by the SP to store actual values of encryption keys, so that secret key materials cannot be accessed by any operating system or user-level process. Of course, because the SPK operates at privilege-level 0, malicious SPK code could circumvent the memory protections. The bases for trusting SPK code include: (1) there are a bounded number of SPK mechanisms; (2) each SPK mechanism is relatively small, comprehensible, independent, and self contained; (3) SPK source code may be published and scrutinized by independent experts; (4) the SPK code development process includes detailed code inspections by multiple persons; and (5) SPK code images are digitally signed and verified prior to execution.

In many, currently available computer systems, controllers for I/O devices can directly access physical memory. The SP does not allow direct access of physical memory by any non-SP routine or by external hardware. Instead, the hardware component of the SP needs to include mechanisms to provide virtual-address-to-physical-address translations, or other means, to restrict the physical addresses accessible to I/O hardware, within hardware bus adapters and routing components, so that an I/O controller can exchange data only with a memory area allocated for that purpose by the SP, but cannot access memory outside of the memory area allocated to the I/O controller.

Figure 17:
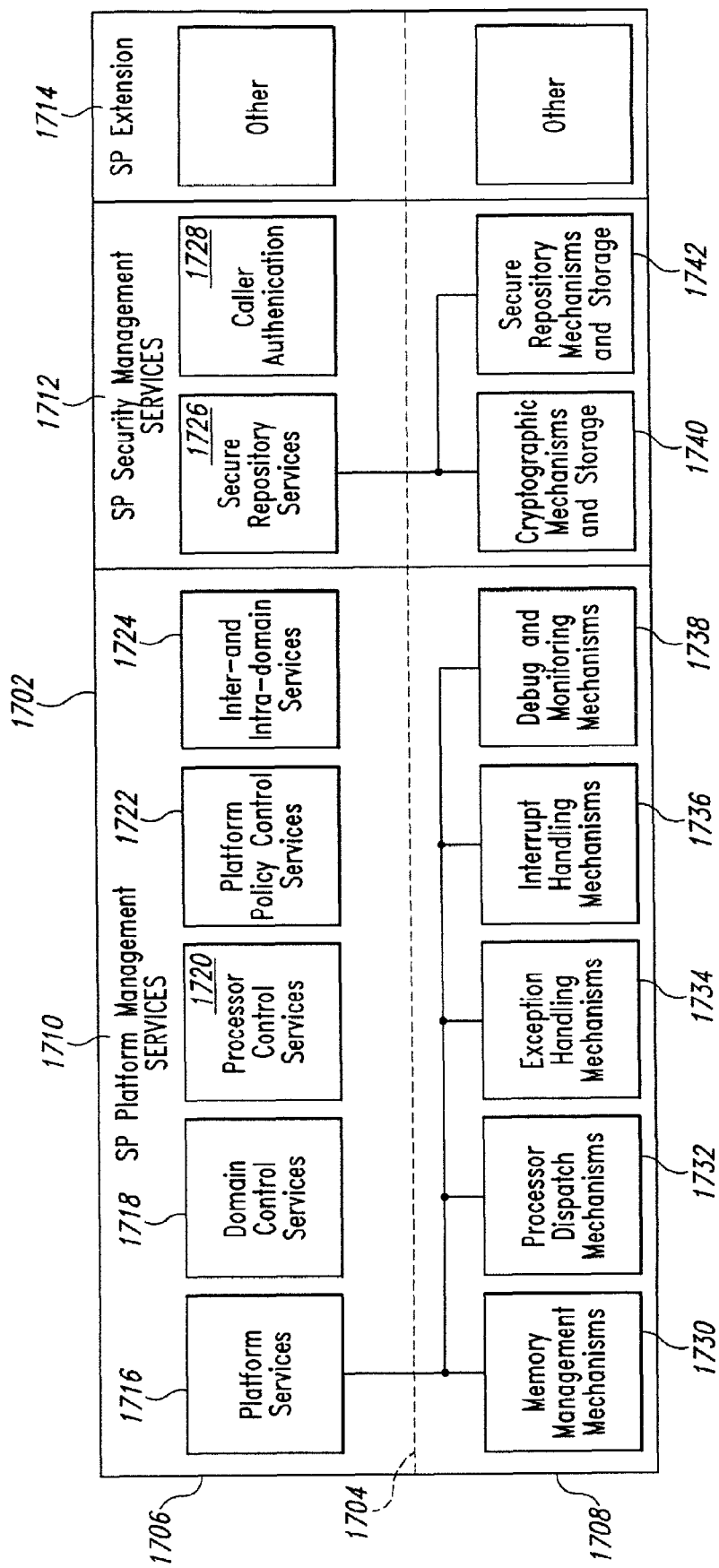
FIG. 17 is a block diagram of the functionality provided by the software layers of the SP.

The software-layer of the SP (1604 in FIG. 16) interfaces to the hardware-firmware interface (1508 in FIG. 15) and to one or more operating systems via the SPI (1502 in FIG. 15). The software-layer of the SP is, itself, divided into at least two layers, with at least one internal interface. FIG. 17 is a block diagram of the software layer of the SP. The software layer of the SP 1702 is divided, along dashed line 1704, into a secure platform global services ("SPGS") layer 1706 and a secure platform kernel ("SPK") layer 1708. In one embodiment of the present invention, routines of the SPGS 1706 execute at privilege level PL1, while routines of the SPK 1708 execute at PL0. The internal division allows for constructing a relatively small SPK that can be verified by formal verification methods, code walkthroughs, and, ultimately, by publication to experts within the security and computer operating systems communities. Thus, highest-privileged code of the SPK can be made as bug-free and robust as possible, and all other parts of the system are fully protected from Trojan-horse or bug-germinated PL0 code that can detrimentally access and modify protected memory areas allocated to other processes.

The SPGS interface logically comprises three main sub-interfaces: (1) SP Platform Management Services 1710 that provide means for configuring the logical and physical resources of the system, and the means for the domain operating system or custom control program to affect the privileged state of the machine; (2) SP Security Management Services 1712 that provide the cryptographic and secure storage functions of the SP, including, for example, distinct functional components that each can be protected by distinct protection keys for isolation of various system components; and (3) SP Extensions 1714 that allow for extending the SP's functional requirements over time, allowing addition of functionality, such as additional cryptographic algorithms, to the SP. In FIG. 17, the sub-interface divisions are carried through to the SPK, for clarity of related discussion. The SP interface may entirely consist of SPGS services that, in turn, invoke SPK mechanisms, or may consist of SPGS services that invoke SPK mechanisms, as needed, as well as SPK mechanisms.

The SP Platform Management Services sub-interface 1710 includes: (1) SP Platform Services 1716 invoked by an operating system or custom control program to perform functions that need privileged operations, that involve SP resources, or that are security-sensitive; (2) Domain Control Services 1718 that provide for creation, configuration, reinitialization, and shutdown of domains; (3) Processor Control Services 1720 that provide for configuration and scheduling of logical and physical CPUs; (4) Platform Policy Control Services 1722 that provide for specification, retention, and application of platform policy, such as, for example, allocation of system resources; and (5) Inter- and Intra-Domain Services 1724 that provide for signaling events between logical CPUs within and between domains, sharing resources between domains, and providing data transfer for fast networking or data exchange. The SP Platform Management Services 1710 may, in turn, invoke one or more of the SP mechanisms, described below. The SP Platform Management Services validate parameters and authenticate calls before calling the SP mechanisms. Additional details of some specific SP Platform Services routine interfaces are provided in Appendix A.

The SP Security Management Services sub-interface 1712 includes:

(1) Secure Repository Services 1726, invoked by an operating system, custom control program, or user-application program, provide functions that use secrets available only to specific mechanisms executing at the highest privilege level of the system, PL0, including (a) cryptographic services that provide for encrypting and decrypting data using one or more cryptographic algorithms, and (b) secure data services; and (2) Caller Authentication Services 1728 that provide means for domains to associate a secure tag, retained in state accessible only to the SP, with system objects, including specific users, application programs, operating-system components, directories, files, and dispatchable objects, and to use that tag to authenticate access to platform and secure repository services. The secrets used by the functions include cryptographic key materials. By hiding the keys, even from the domains that use them, key materials can be kept safe, even if the domain operating system, custom control program, or user-application program is compromised by an attacker. Secure systems need to establish repositories, such as secure logs, that cannot be accessed or modified except through specific interfaces. SP provides basic functionally to allow a domain operating system or custom control program to contribute to and query a secure repository. Additional details of specific SP Repository Services routine interfaces are provided in Appendix B.

SP Platform Services 1716 include memory management, process management, and interruption management services. Memory management services provide for control of the creation, manipulation, and deletion of mappings between virtual and physical addresses and controls the processor TLB (914 in FIG. 9) and virtual page table (1004 in FIG. 10). The IA-64-based SP implementation assigns disjoint sets of region identifiers to each domain so that extended virtual addresses are unique across all domains. Each domain is also assigned disjoint ranges of physical memory. This ensures that one domain cannot access the physical memory of another. Every page of memory is also associated with a protection key, which enables compartments or other finer-granularity controls on memory accesses.

Process management services provide for control of execution of processes on physical processors. SP implements two processor-related abstractions: dispatchable objects and logical CPUs. A dispatchable object is a saved thread of control and an associated addressing context within a domain. The dispatchable object contains the state necessary to resume execution at the point that the thread of control was previously interrupted. The addressing context is the set of associated region IDs and protection keys, drawn from the domain's set. These values determine the legitimate extended virtual addressing context for a dispatchable object. An operating system or custom control program schedules dispatchable objects by saving the current execution state in a dispatchable object and restoring the execution state from another dispatchable object.

Logical CPUs are the domain's view of one or more physical processors. A domain may have one or more logical processors. The number of logical processors in a domain and the total of logical processors in all domains may be less than, equal to, or greater than the total of physical processors in the system. Logical processors are scheduled and dispatched to physical processors by the SP. An operating system or custom control program is generally unaware of this scheduling, enabling changes to the CPU configuration without OS involvement.

SP interruption management services provide for handling immediate interruptions, and for then dispatching notification of interruptions to an operating system or custom control program. An interruption is any event that causes control to be redirected to specific handling routines. Interruptions, as defined by the IA-64 architecture, are divided into four categories: (1) aborts, either processor resets or an internal machine malfunction; (2) faults, synchronous interrupts resulting from an instruction specifying an action that cannot or should not be carried out, or for which system intervention is needed before the instruction is executed; (3) traps, synchronous interrupts resulting when a completed instruction needs system intervention; and (4) asynchronous interrupts, representing asynchronous events or signals generated by external entities or entities independent from a processor, including I/O-device-related events, that need to be delivered to handlers in the temporal order of their occurrence within priority classes. In FIG. 17, aborts, faults, and traps are called "Exceptions;" asynchronous interrupts are called "Interrupts".

Various SPK mechanisms are provided to the SPGS through an internal SPK/SPGS interface, logically coincident with dashed line 1704 in FIG. 17. The SPK mechanisms are accessed by the SPGS via calls. The SPK comprises a set of mechanisms that generally run in the context of calling processes. SPK mechanisms include: (1) memory management mechanisms 1730; (2) processor dispatch mechanisms 1732; (3) exception handling mechanisms 1734; (4) interrupt handling mechanisms 1736; (5) debug and monitoring mechanisms 1738; (6) cryptographic mechanisms and storage 1740; (7) secure repository mechanisms and storage 1742.

Memory management mechanisms perform the privileged operations for inserting translations into the TLB, VHPT, and other page tables. Processor dispatch mechanisms handle the saving and restoring of state to and from dispatchable objects and logical CPUs. These mechanisms are needed because much of the state, such as the addressing context, is privileged. Exception handling mechanisms deal with faults, traps, special hardware events such as machine checks or changes to the hardware configuration, and SP generated events. An operating system or custom control program registers an exception handler routine via the SPI to be invoked when exceptions occur. When an exception occurs, the SP saves a minimum amount of processor state, then transfers control to the registered exception handler. Some faults and traps may be handled directly by the SP for performance or to simplify the interface to a domain operating system or custom control program. When an operating system or custom control program needs to receive notification of interrupt events, the operating system or custom control program registers an interrupt handler routine via the SPI for each interrupt expected to occur in the corresponding domain. When an interrupt occurs, the SP invokes the associated handler routine in a special, pre-constructed execution environment to allow for rapid interrupt response. Interrupts are queued by SP for delivery to each operating system or custom control program in a manner preserving the temporal order. One special interrupt provided by SP is a timer tick, an interrupt that occurs at a fixed time interval. Each operating system or custom control program can specify notification at any integer multiple of the fixed time interval.

Debug and monitoring mechanisms employ a collection of machine registers to assist debugging and performance monitoring. This SP mechanism performs the privileged accesses necessary for an operating system or custom control program to utilize the debugging-and-performance-monitoring machine resources. Cryptographic mechanisms and secure storage mechanisms provide encryption, decryption, and key management functions. The cryptographic algorithms include standard symmetric-key block and stream ciphers, public key encryption, and secure hashing functions. Key management functions include key generation, key import, key export, and key material preparation. Secure repository mechanisms and storage mechanisms can be viewed as software objects containing secret data along with associated access methods, residing at the highest privilege level of the system. This set of mechanisms is extensible.

Secure Boot Process

Figure 18:
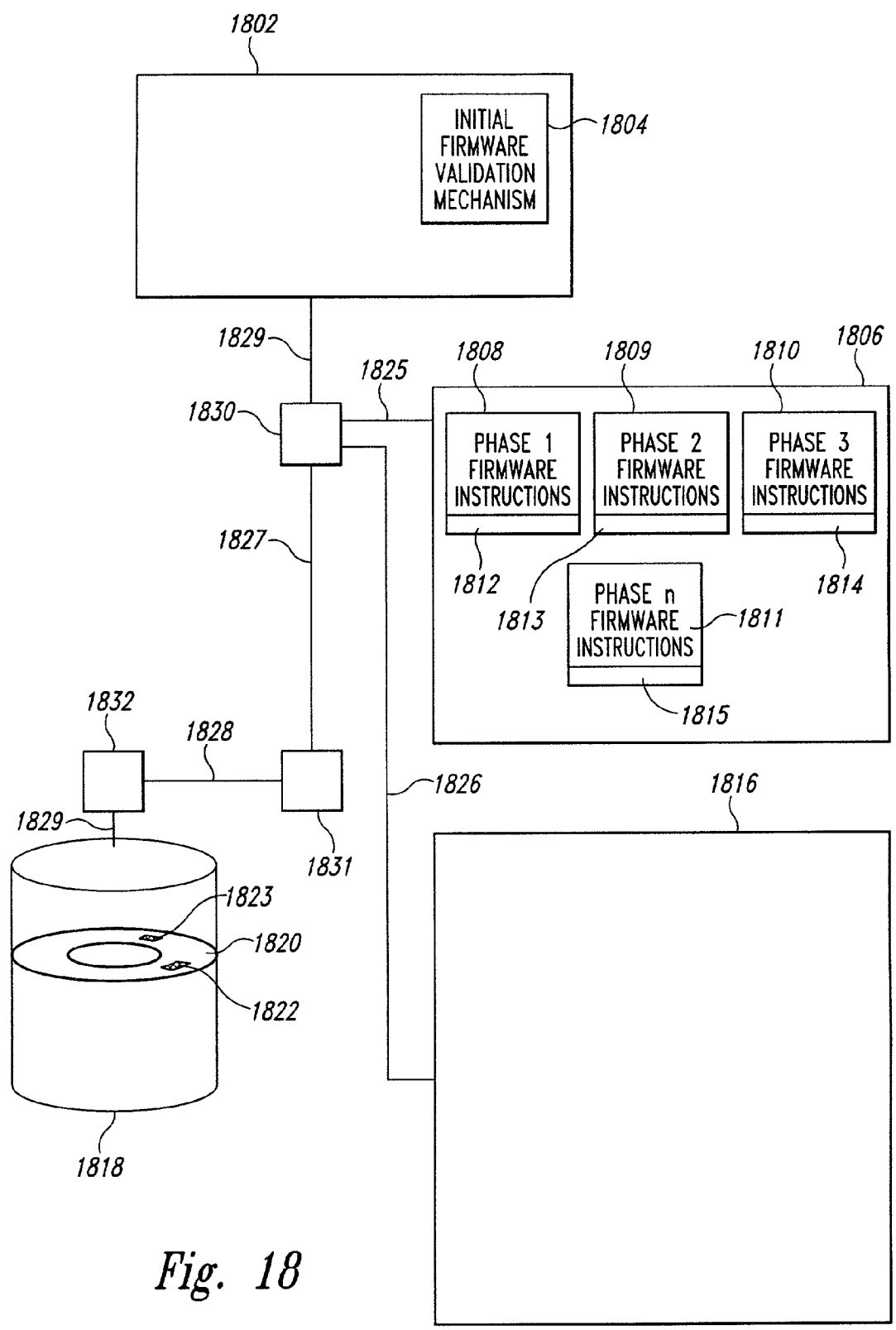
FIG. 18 is block diagram of hardware components of a system related to the secure boot process.

The SP provides mechanisms that allow for securing components of the system, so that, with proper structuring and implementation, an operating system can provide a secure base for user-level applications and processes. An important component of the SP is a secure boot procedure that assures a sequence of known, correct system states from initial power-on until launching of one or more operating system processes. FIG. 18 is block diagram of hardware components of a system related to the secure boot process. Related hardware components include: (1) a processor 1802 that contains an initial firmware validation mechanism 1804 comprising active logic and stored firmware instructions; (2) a read-only memory ("ROM") 1806 containing digitally-signed sets of firmware instructions 1808–1811 (digital signatures indicated as small fields 1812–1815) representing n different sets of firmware instructions, each set related to a different phase of the secure boot process; (3) main memory 1816; (4) a mass-storage device 1818 that stores instructions for an OS loader program and at least one OS 1820, as well as digital signatures 1822–1823 for the OS loader and OS; and (5) various internal busses 1824–1829 and bus bridges/routers/controllers 1830–1832 that facilitate data communications between the previously described components.

Figure 19:
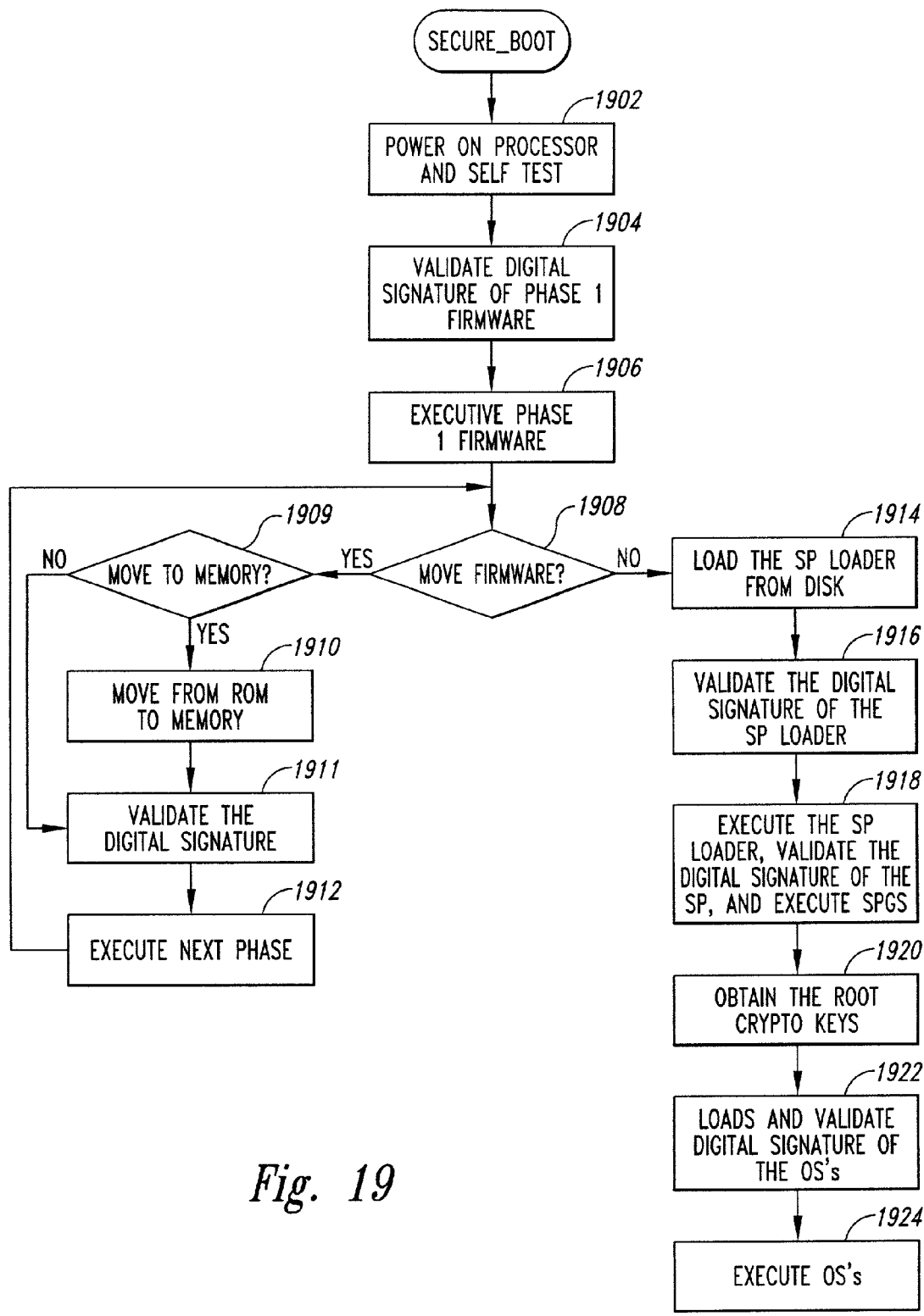
FIG. 19 is a flow-control diagram for a secure boot process, "secure$_{13}$ boot," that represents one embodiment of the secure boot process component of the SP.

FIG. 19 is a flow-control diagram for a secure boot process, "secure_boot," that represents one embodiment of the secure boot process component of the SP. Secure_boot is described, in FIG. 19, for a single-processor system, although alternative secure_boot routines that boot multi-processor systems are straightforward extensions of the secure_boot routine described with reference to FIG. 19. In step 1902, secure_boot powers on the processor and controls the processor to execute any self-test routines included as part of the processor. In step 1904, secure_boot validates the digital signature (1812 in FIG. 18) of the phase 1 firmware instruction set (1808 in FIG. 18). In step 1906, secure_boot controls the processor to execute the phase 1 firmware instruction set. Next, in a while-loop comprising steps 1908–1912, secure_boot checks for a next set of firmware instructions, in step 1908. If another set of firmware instruction remains to be executed, as determined in step 1908, then secure_boot determines, in step 1909, whether or not to move the firmware instruction set to main memory for execution. If the next firmware instruction set is to be moved to main memory, then secure_boot, in step 1910, copies the next firmware instruction set from ROM to main memory. Next, in step 1911, secure_boot validates the digital signature associated with the next set of instructions, as well as enables the code to be executable and prevents modification of the code, and, following validation, controls the processor to execute the next instruction set in step 1912. The term "validate" is used, below, to mean digital-signature validation, and setting of code-access permissions to be executable, but not writable. Of course, in all digital-signature-validation steps, such as steps 1904 and 1911, if the digital signature fails validation, secure_boot returns an error and fails. The non-validating firmware or software needs to be corrected before secure boot is re-executed.

Once all of the sets of firmware instructions in ROM have been validated and executed by secure_boot, secure_boot loads the SP loader into memory from a mass-storage device, in step 1914, validates the digital signature included in the SP loader in step 1916 and, in step 1918, executes the SP loader to load the SP software, validates the digital signature associated with the SP software, and then executes one or more SPGS routines. Note that various phases of firmware instructions and SP code images may have been signed by different private keys, and may need corresponding public keys for validation of digital signatures. Once an executable code image has been validated, any public key contained in that code image can be trusted. The secure boot process can be viewed as a process of building a chain of trust, based upon the validation performed by the hardware at the beginning of the secure boot process, and extending through execution of the last verified code image. It is possible, and recommended, that every OS loader and OS extend the chain of trust into the OS and application layers.

In step 1920, SPGS needs to obtain root cryptography keys. This can be done by supplying the keys externally or by a security chip integrated within the platform, such as a TCPA chip. Using these root keys, and assuming the OS has been designed to extend the chain of trust beyond SP, SPGS loads and validates an OS loader, executes the OS loader to load at least one OS, validates the OS, and, in step 1924, executes at least one OS. At the point that an OS begins execution, a fully validated and authenticated, and secure, SP has been initialized to support the OS. It is then the responsibility of the one or more OSs started in step 1924 to maintain system security, using the rich set of services provided by the SP, during system operation. Even is an OS is penetrated by a successful attack, the attacker does not acquire privilege-level 0, contrary to present OS vulnerabilities.

Although the present invention has been described in terms of a particular embodiment, it is not intended that the invention be limited to this embodiment. Modifications within the spirit of the invention will be apparent to those skilled in the art. For example, the combined-hardware-and-software secure-platform interface that represents one embodiment of the present invention may be implemented with an almost limitless number of different routine interfaces, in many different programming and program specification languages. Although the described embodiment featured the Intel® IA-64 architecture as a principal component of the hardware layer, other different modern computer processor architectures might also be used in the hardware layer of the secure platform. The combined-hardware-and-software secure-platform interface that represents one embodiment of the present invention may be extended to provide additional services and functionalities in addition to those discussed above, and many alternative combined-hardware-and-software secure-platform interfaces may be devised.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

Appendix A

In embodiments of the present invention the Secure Platform Services furnish to all operating systems and custom control programs the functional capabilities implemented by the underlying hardware privileged registers and instructions. This is done by means of architected software interfaces to the platform services provided by SPGS and SPK.

Some platform services abstract the functionality provided by certain privileged registers and instructions; other platform services correspond closely to specific privileged registers and/or instructions. The intent of the Secure Platform Architecture is to provide to each operating system and custom control program the full functional capability of the underlying hardware, but only for those system resources under its control.

The Secure Platform Services comprises several categories of services. These services include those to enable an operating system or custom control program to:
Manage physical and virtual memory addressing.
Manage addressing for I/O and DMA I/O operations.
Manage dispatchable objects ("DO"s, state save areas for elements called "processes", "tasks", or "threads" by various operating systems).
Manage synchronous and asynchronous interruptions.

In one embodiment of the present invention a few representative service interfaces in these categories would include:

Addressing
spSetPageSize(PageSize, Virtual Address, Size)
　Specify the page size for a virtual address span.
Old_Attributes=spMapMemory(Virtual Address, Physical Address, Size, Properties);
　Map a virtual address span.
spSyncMappings(Virtual Address, Size);
　Synchronize mapping among multiple processors.
I/O Address=spEnableDMAmap(Virtual Address, Size, Read|Write);
　Establish physical address mapping for Read or Write DMA I/O operation.
spDisableDMAmap(Virtual Address, Size);
　Disable physical address mapping for DMA I/O operation.

Properties
Property values are used to communicate settable parameters of a mapping between the domain OS and SP. Examples include:

| Properties | Meaning |
| --- | --- |
| SP_MAPPING_VALID | This mapping is valid and should be used. |
| SP_MAPPING_PRIVILEGED | This mapping is only available to privileged code |

-continued

| Properties | Meaning |
| --- | --- |
| SP_MAPPING_PRIVILEGED_READ | The page mapped must be readable by privileged code |
| SP_MAPPING_PRIVILEGED_WRITE | The page mapped must be writable by privileged code |
| SP_MAPPING_PRIVILEGED_EXECUTE | The page mapped must be executable by privileged code |
| SP_MAPPING_USER_READ | The page mapped must be readable by unprivileged code |
| SP_MAPPING_USER_WRITE | The page mapped must be writable by unprivileged code |
| SP_MAPPING_USER_EXECUTE | The page mapped must be executable by unprivileged code |
| SP_MAPPING_ACCESSED | The page mapped should be considered accessed |
| SP_MAPPING_DIRTY | The page mapped should be considered dirty |
| SP_MAPPING_EXCEPTION_DEFERRAL | Exceptions generated speculatively on this page should be deferred |
| SP_MAPPING_PAGESIZE_4K, etc | Should these be exported? |
| SP_MAPPING_KEY(key) | SP_MAPPING_KEY is a macro which is used to specify the protection key associated with this page |
| SP_MAPPING_PROMOTE | The page mapped must be executable, and must allow privilege promotion |

Dispatchable Objects[1]

[1] This interface is IA-64 specific; an analogous interface can be defined for other architectures.

Initialization and Start-up void (*os_entry)(spHandle defaultDO, spHandle CPU)
　This is the entry address from the OS boot image. Execution begins here on the boot processor (in an MP system). The execution environment has been initialized enough that this routine can be in C. SP services are available.
void (*os_mp_entry)(spHandle defaultDO, spHandle CPU)
　This is the entry address registered by the OS when it is ready to begin multiprocessor operation. The execution environment is the same as the OS entry point, except that additional functions in the kernel are initialized and enabled.
spErr spStartMP(void (*mpEntry)(spHandle, spHandle))
　Called from the OS when transitioning to multiprocessor operation. It is possible that other CPUs may begin execution before this call returns.

Process Management spErr spCreateDO(spHandle *newDO, void *stack, void *rse, unsigned int flags)
　Creates a new dispatchable object with the specified stack/RSE areas. The flags indicate various creation modes, e.g., whether to copy/share/copy-on-write the parent DO virtual addressing. The stack and RSE areas must be addressable by the parent DO.

spErr spSwitchDO(spHandle newDO, int die)

Switch execution on the current CPU to the specified DO. If the die flag is set, the current DO is deleted before the call returns. The call may fail if newDO is not a legal DO handle, or is already dispatched.

spErr spResume(spResumeState *resumeState)

Resumes a constructed or previously saved process state. This call is used when changes to privileged state, e.g., domain-controlled PSR bits, is required.

spErr spDeleteDO(spHandle victim)

Delete the specified DO; it is deleted before the call returns. The call may fail if newDO is not a legal DO handle, or is currently dispatched.

Debugging & Performance Monitoring spErr spGetDebugInfo(struct spDebugInfo *debugConfig)

Stores the following information: number of data break registers, number of instruction break registers, the largest valid data address mask, and the largest valid instruction mask. If no break registers are available, the values are set to zero. As SP may reserve one or more high registers for its use, the return value may be less than the actual hardware.

spErr spSetDBR(int reg, void *addr, unsigned long mask, unsigned int mode)

spErr spSetIBR(int reg, void *addr, unsigned long mask, unsigned int mode)

Sets the specified data (instruction) break register to raise a data (instruction) debug fault when (access & mask)==(addr & mask). The mode parameter specifies read and/or write access for data breakpoints, execute for instruction breakpoints, and the access privilege level (privileged for the domain OS, unprivileged for applications). If mode is 0, the specified debug register is disabled.

This call fails if reg is not a valid debug register, addr is invalid, or if mask or mode cannot be honored by the hardware.

spErr spSetPMC(int reg, unsigned int event, unsigned int flags)

Sets control for the specified generic monitor: $4 \leq reg \leq 7$. The event is implementation specific. The flags parameter specifies which privilege levels are monitored, whether or not to reset the associated counter, and whether the monitor enable is privileged or under application control.

Unlike other calls, this can be called from applications (privilege level 3). The call fails if reg is invalid, or if an application tries to set a privileged monitor.

spErr spReadPMD(unsigned long long *val, int reg)

Read the event count for the specified generic monitor: $4 \leq reg \leq 7$.

Unlike other calls, this can be called from applications (privilege level 3). The call fails if reg is invalid. If the monitor is privileged and the caller is at privilege level 3, the value 0 is returned to be consistent with IA-64 hardware behavior.

spErr spSetPMCX(int reg, unsigned long val, unsigned int flags)

Sets control for the specified generic monitor: reg<4 or reg>7. The val is implementation specific.

Unlike other calls, this can be called from applications (privilege level 3). The call fails if reg is unimplemented, val is illegal, or if an application tries to set a privileged monitor.

spErr spReadPMDX(unsigned long long *val, int reg)

Read the event count for the specified performance monitor data: $0 \leq reg \leq 255$.

Unlike other calls, this can be called from applications (privilege level 3). The call fails if reg is invalid. If the monitor is unimplemented, or privileged and the caller is at privilege level 3, the value 0 is returned to be consistent with IA-64 hardware behavior.

Scheduling & Shutdown spErr spDispatchAffinity(int value)

Sets the dispatch affinity for the current CPU. value is the relative importance of redispatching on the last CPU; $0 \leq value \leq 100$.

spErr spPause(void)

Places the current CPU into the scheduling pool with a ready status.

spErr spHalt(void)

Suspends scheduling for the current CPU until an external interrupt is delivered to the domain. Note that inter-processor communications are modeled as external interrupts.

spErr spShutDown(void)

Permanently removes the current CPU from scheduling and deletes all associated state.

Interruptions

The IA-64 architecture defines an interruption as any event that causes control to be passed to specific handling routines. There are four classes of interruptions:

1. Aborts The processor has detected a Machine Check (internal malfunction), or a processor reset. Aborts are PAL-based interruptions; they may or may not be reflected to the domain OS.
2. Interrupts The processor has received a request to perform a service. Interrupts may be from external I/O, other processors, or CPU internal events (e.g., timer tick).
3. Faults The current Itanium or IA-32 instruction which requests an action that cannot or should not be carried out, or system intervention is required before the instruction is executed. Faults are synchronous with respect to the instruction stream.
4. Traps The IA-32 or Itanium instruction just executed requires system intervention. Traps are synchronous with respect to the instruction stream.

Aborts, faults and traps are collectively referred to as exceptions.

spErr spRegisterISR(int vector, void (*isr)( . . . ), void *param)

Register a routine to be called when an external interrupt is delivered to the domain.

spErr spRegisterHandler(void (*eHandler)( . . . ), void *param)

Register a routine to be called when an exception occurs in the domain.

spErr spSPL(int level)

Prevent delivery of all interrupts on vectors less than or equal to the specified level. If level==SPDISABLEINTR, all interrupts are disabled; if level==SPENABLEINTR, all interrupts are enabled. When the interrupt level is lowered, any enabled pending interrupts may be delivered before the call returns.

sperr spSignal(spHandle logicalCPU, void *message)

Delivers an inter-processor "interrupt" to the specified CPU. The 64-bit message value and handle for the sending CPU are delivered as the interrupt value

Appendix B

In embodiments of the present invention the Secure Repository Services furnish to operating systems, custom control programs, and user applications functions that require processing and, in some cases, retention of critical data that must never be accessible outside of the services themselves. The structure of the SP Architecture assures that such critical data, as well as the binary code images of the functions that manipulate such data, never directly can be read or modified by any code in an operating system, a custom control program, or an application.

Primary examples of Secure Repository Services are cryptographic services, which require processing with, and safekeeping of, data such as cryptographic key materials in the clear. A basic set of cryptographic services is essential in every embodiment of the present invention. Additional examples of Secure Repository Services would include services utilizing operational security policy and state data, such as those required by IPSec and SE-Linux, logging critical auditing information, or offering alternative or higher-grade sets of cryptographic services. Source code for all of SPK as well as for the basic set of cryptographic services are published and open to public scrutiny. Providers of additional Secure Repository Services are free either to publish or to hide the details of their additions.

The SP Architecture is open-ended with respect to the set of Secure Repository Services that may be incorporated. The Architecture deliberately is structured to compartmentalize each set of Secure Repository Services, isolating each set both from all other Secure Repository Services and from the SP Secure Platform Services. This further restricts direct access to critical data and code images, by protecting them not only from operating systems and applications, but also from all other SPGS and SPK compartments.

This is in sharp contrast with traditional operating system architecture, in which dedicated, special purpose hardware is required even to protect limited amounts of critical data from a successful attacker. Even with special purpose hardware, such an attacker freely can access all other data in main memory or stored upon external storage devices, or interfere with the availability or internal state of the special purpose hardware. In large servers, cost, the amount of critical data, and the need to avoid performance bottlenecks prevent a sufficiency of dedicated, special purpose hardware modules from being an adequate solution. The SP Architecture, on the other hand, enables utilization of all main processors and, if needed, massive quantities of main memory for holding and processing must-be-secured data.

In one embodiment of the present invention, compartments are implemented using IA-64 Protection key Registers. Upon entry to SP, hardware state is set to limit access solely to the specified compartment, and control is passed to the designated service. All SP source code governing this linkage also may be published and open to public scrutiny.

The exact repertoire of the basic set of cryptographic services is chosen to provide support for required cryptographic standards, such as SSL/TLS,[2] the TCPA (Trusted Computing Platform Alliance) Main Specification, Version 1.0,[3] or the Microsoft CAPI (Crypto API) Specification.[4] Hardware security chips presently are being developed and incorporated into hardware to provide support for some foundational cryptographic functions. The implementation of the SP basic set of cryptographic services is structured to permit use of these security chips when they are present.

[2] Details may be found at: http://www.ietf.org/ID.html.
[3] Modifications to this specification presently are expected. Details may be found at: http://www.trustedpc.org/home/pdf/Mainv1 0.pdf.
[4] Details may be found at: http://www.microsoft.com/technet/security/prodtech.cryptech.asp.

In broad terms, the basic cryptographic services include means for creation, export, import, replacement, retention, and destruction of symmetric and asymmetric keys. Also, a suite of encryption and decryption functions for the repertoire of ciphers required for internal use or supported standards are included. Similarly, the required suites of cryptographic hash functions, message authentication functions, digital signature functions, as well as random number and unique ID generators are provided.

The invention claimed is:

1. A combined-hardware-and-software secure-platform interface, the hardware providing a number of privilege levels, non-privileged instructions, non-privileged registers, privileged instructions, and privileged registers, the combined-hardware-and-software secure-platform interface comprising:

non-privileged instructions and non-privileged registers provided by the hardware instruction-set architecture; and a set of callable software services that, when invoked, can execute at a privilege level that is more privileged than the privilege levels of calling programs, and that provide for operational control of hardware resources without exposing privileged instructions and privileged registers of the hardware and without simulating privileged instructions and privileged registers.

2. The combined-hardware-and-software secure-platform interface of claim 1, wherein the hardware provides firmware interfaces and at least four privilege levels in addition to non-privileged instructions, non-privileged registers, privileged instructions, and privileged registers, and also provides a means to restrict the physical memory addresses that can be accessed by I/O operations.

3. The combined-hardware-and-software secure-platform interface of claim 1, wherein the set of callable software services include:

a set of secure-platform management services that provide a caller with operational control of hardware resources that do not expose privileged instructions and registers of the hardware and that do not simulate privileged instructions and privileged registers, and a set of security-management services that employ internally generated secret data, each security-management service managing internal secret data without exposing the internal secret data to computational entities other than the security-management service.

4. The combined-hardware-and-software secure-platform interface of claim 1 wherein secure-platform management services include:

platform services invoked by an operating system or custom control program to perform functions that use privileged operations, that involve SP resources, or that are security-sensitive;

domain-control services that provide for creation, configuration, reinitialization, and shutdown of domains;

processor-control services that provide for configuration and scheduling of logical and physical CPUs;

platform-policy-control services that provide for specification, retention, and application of platform policy, such as, for example, allocation of system resources; and inter-and-intra-domain services that provide for signaling events between logical CPUs within and between domains, sharing resources among domains, and providing data transfer for fast networking or data exchange among domains.

5. The combined-hardware-and-software secure-platform interface of claim 1 wherein security-management services include:

secure repository services, invoked by an operating system, custom control program, or a user-application program, that provide functions that use secrets available only to certain processes executing at the highest privilege level of the system; and caller authentication services that provide means for domains to associate a secure tag with specific users, application programs, operating system components, directories, files, dispatchable objects, or other system objects, including specific users, application programs, operating-system components, directories, files, and dispatchable objects, and to use that tag to authenticate access to platform services and secure-repository services.

6. The combined-hardware-and-software secure-platform interface of claim 5 wherein secure repository services include:

cryptographic services that provide for encrypting and decrypting data using one or more cryptographic functions, including functions that compute one-way hash functions, message authentication codes, digital signatures, and random numbers; and secure data services, including secure logs, policy data bases, and other forms of services that use secret data that needs to be compartmentalized and isolated from all other system components.

7. Computer instructions that implement a software portion of the combined-hardware-and-software secure-platform interface of claim 1 encoded in a computer-readable medium.

8. A computer system comprising at least one user-level program, at least one operating system, a hardware platform, and the combined-hardware-and-software secure-platform interface of claim 1.

9. A computer system that hosts a control program, the control program one of an operating system or customized control program, the computer system comprising:

a hardware platform providing a number of execution privilege levels, non-privileged instructions and non-privileged registers, and privileged instructions and privileged registers;

a set of software services callable by the control program for performing operations requiring one or both of the privileged instructions and privileged registers and that, when invoked, can execute at a privilege level that is more privileged than a privilege level at which the control program executes, the calling programs neither simulating privileged instructions and privileged registers nor exposing privileged instructions and privileged registers to the control program; and a secure platform kernel that executes at a most privileged level.

10. The computer system of claim 9 wherein the secure platform kernel authenticates calls to the software services before launching execution of the software services.

11. The computer system of claim 9 further comprising:

a combined-hardware-and-software secure-platform interface that conceals the privileged instructions and privileged registers, providing an interface to the non-privileged instructions and non-privileged registers provided by the hardware instruction-set architecture and to the set of callable software services.

12. The computer system of claim 9 wherein the hardware provides firmware interfaces and at least four privilege levels in addition to non-privileged instructions, non-privileged registers, privileged instructions, and privileged registers, and also provides a means to restrict the physical memory addresses that can be accessed by I/O operations.

13. The computer system of claim 9 wherein the set of callable software services include:

a set of secure-platform management services for operational control of hardware resources that do not expose privileged instructions and privileged registers of the hardware and that do not simulate privileged instructions and privileged registers; and a set of security-management services that employ internally generated secret data, each security-management service managing internal secret data without exposing the internal secret data to computational entities other than the security-management service.

14. The computer system of claim 13 wherein secure-platform management services include:

platform services invoked by an operating system or custom control program to perform functions that use privileged operations, that involve SP resources, or that are security-sensitive;

domain-control services that provide for creation, configuration, reinitialization, and shutdown of domains;

processor-control services that provide for configuration and scheduling of logical and physical CPUs;

platform-policy-control services that provide for specification, retention, and application of platform policy, such as, for example, allocation of system resources; and inter-and-intra-domain services that provide for signaling events between logical CPUs within and between domains, sharing resources among domains, and providing data transfer for fast networking or data exchange among domains.

15. The computer system of claim 13 wherein security-management services include:

secure repository services, invoked by an operating system, custom control program, or a user-application program, that provide functions that use secrets available only to certain processes executing at the highest privilege level of the system; and caller authentication services that provide means for domains to associate a secure tag with specific users, application programs, operating system components, directories, files, dispatchable objects, or other system objects, including specific users, application programs, operating-system components, directories, files, and dispatchable objects, and to use that tag to authenticate access to platform services and secure-repository services.

16. The computer system of claim 15 wherein secure repository services include:

cryptographic services that provide for encrypting and decrypting data using one or more cryptographic functions, including functions that compute one-way hash functions, message authentication codes, digital signatures, and random numbers; and secure data services, including secure logs, policy data bases, and other forms of services that use secret data that needs to be compartmentalized and isolated from all other system components.

17. The computer system of claim 9 further including an internal interface that provides various secure-platform-kernel mechanisms, including:
memory management mechanisms;
dispatch mechanisms;
exception mechanisms;
interrupt mechanisms;
debug and monitoring mechanisms;
cryptographic mechanisms;
cryptographic storage mechanisms;
secure repository mechanisms; and
secure repository storage mechanisms.

18. The computer system of claim 9 further including a secure boot process incorporated within hardware, software, firmware, or a combination of two or more of hardware, software, and firmware, that authenticates and validates each firmware and software routine executed to initialize the system up to execution of an operating system.

19. The computer system of claim 18 wherein the secure boot process validates each firmware and software routine prior to execution of the firmware or software routine, including operating-system routines and user-application programs.

20. A method for securing a computer system, the method comprising:
providing a hardware platform with a number of privilege levels, memory compartmentalization facilities that control access by an entity to a unit of memory, and memory partitioning facilities that partition memory into sets of regions, each region comprising a number of memory units;
providing a set of callable software services that, when invoked, can execute at a privilege level that is more privileged than the privilege levels of calling programs, that provide for operational control of hardware resources without exposing privileged instructions and privileged registers of the hardware and without simulating privileged instructions and privileged registers, and that, together with the hardware platform, comprise a combined-hardware-and-software secure platform;
providing a combined-hardware-and-software secure-platform interface that exposes non-privileged instructions and non-privileged registers to operating systems and custom control programs, that provides interfaces to the callable software routines, and that conceals the privileged instructions and privileged registers; and
launching an operating system or control program that interfaces to the combined-hardware-and-software secure-platform interface.

21. The method of claim 20, wherein the hardware platform provides firmware interfaces and at least four privilege levels in addition to non-privileged instructions, non-privileged registers, privileged instructions, and privileged registers, and also provides a means to restrict the physical memory addresses that can be accessed by I/O operations.

22. The method of claim 20, wherein the set of callable software services include:
a set of secure-platform management services that provide a caller with operational control of hardware resources without exposing privileged instructions and registers of the hardware and without simulating privileged instructions and privileged registers, and
a set of security-management services that employ internally generated secret data, each security-management service managing internal secret data without exposing the internal secret data to computational entities other than the security-management service.

23. The method of claim 22 wherein secure-platform management services include:
platform services invoked by the operating system or custom control program to perform functions that use privileged operations, that involve SP resources, or that are security-sensitive;
domain-control services that provide for creation, configuration, reinitialization, and shutdown of domains;
processor-control services that provide for configuration and scheduling of logical and physical CPUs;
platform-policy-control services that provide for specification, retention, and application of platform policy, such as, for example, allocation of system resources; and
inter-and-intra-domain services that provide for signaling events between logical CPUs within and between domains, sharing resources among domains, and providing data transfer for fast networking or data exchange among domains.

24. The method of claim 22 wherein security-management services include:
secure repository services, invoked by an operating system, custom control program, or user-application program, that provide functions that use secrets available only to certain processes executing at the highest privilege level of the system; and
caller authentication services that provide means for domains to associate a secure tag with specific users, application programs, operating system components, directories, files, dispatchable objects, or other system objects, including specific users, application programs, operating system components, directories, files, and dispatchable objects, and to use that tag to authenticate access to platform services and secure-repository services.

25. The method of claim 24 wherein secure repository services include:
cryptographic services that provide for encrypting and decrypting data using one or more cryptographic functions, including functions that compute one-way hash functions, message authentication codes, digital signatures, and random numbers; and
secure data services such as secure logs, policy data bases, and other forms of services that use secret data that needs to be compartmentalized and isolated from all other system components.

26. The method of claim 20 further including providing an internal interface that provides various secure-platform-kernel mechanisms, including:
memory management mechanisms;
dispatch mechanisms;
exception mechanisms;
interrupt mechanisms;
debug and monitoring mechanisms;
cryptographic mechanisms;
cryptographic storage mechanisms;
secure repository mechanisms; and
secure repository storage mechanisms.

27. The method of claim 20 further including providing a secure boot process incorporated within hardware, software, and firmware that authenticates and validates each firmware and software routine executed to initialize the system up to execution of an operating system.

28. The method of claim 27 wherein the secure boot process validates each firmware and software routine prior to execution of the firmware or software routine, including operating-system routines and user-application programs.

29. Computer instructions that implement a software portion of the combined-hardware-and-software secure platform provided by the method of claim 20.

30. A computer system comprising at least one user-level program, at least one operating system, a hardware platform, and the combined-hardware-and-software secure-platform provided by the method of claim 20.

31. A method for securing a computer system that includes a hardware platform with a number of privilege levels, privileged instructions and privileged registers, non-privileged instructions and non-privileged registers, memory compartmentalization facilities that control access by an entity to a unit of memory, and memory partitioning facilities that partition memory into sets of regions, each region comprising a number of memory units, the method comprising:
providing a software layer that includes
a set of secure-platform management services for operational control of hardware resources that do not expose privileged instructions and registers of the hardware and that do not simulate privileged instructions and privileged registers, and
a set of security-management services that employ internally generated secret data, each security-management service managing internal secret data without exposing the internal secret data to computational entities other than the security-management service; and
providing a combined-hardware-and-software secure-platform interface that exposes non-privileged instructions and non-privileged registers to operating systems and custom control programs, that provides interfaces to the callable software routines, and that conceals the privileged instructions and privileged registers.

32. The method of claim 31, wherein the hardware provides firmware interfaces and at least four privilege levels in addition to non-privileged instructions, non-privileged registers, privileged instructions, and privileged registers, and a means to restrict the physical memory addresses that can be accessed by I/O operations.

33. The method of claim 31 wherein the set of callable software routines, when invoked, can execute at at least two privilege levels that are more privileged than the privilege levels of calling programs.

34. The method of claim 31 wherein secure-platform management services include:
platform services invoked by an operating system or custom control program to perform functions that use privileged operations, that involve SP resources, or that are security-sensitive;
domain-control services that provide for creation, configuration, reinitialization, and shutdown of domains;
processor-control services that provide for configuration and scheduling of logical and physical CPUs;
platform-policy-control services that provide for specification, retention, and application of platform policy, such as, for example, allocation of system resources; and
inter-and-intra-domain services that provide for signaling events between logical CPUs within and between domains, sharing resources among domains, and providing data transfer for fast networking or data exchange among domains.

35. The method of claim 31 wherein security-management services include:
secure repository services, invoked by an operating system, custom control program, or user-application program, provide functions that use secrets available only to processes executing at the highest privilege level of the system; and
caller authentication services that provide means for domains to associate a secure tag with specific users, application programs, operating system components, directories, files, dispatchable objects, or other system objects, including specific users, application programs, operating system components, directories, files, and dispatchable objects, and to use that tag to authenticate access to platform services and secure-repository services.

36. The method of claim 35 wherein secure repository services include:
cryptographic services that provide for encrypting and decrypting data using one or more cryptographic functions, including functions that compute one-way hash functions, message authentication codes, digital signatures, and random numbers; and
secure data services such as secure logs, policy data bases, and other forms of services that use secret data that needs to be compartmentalized and isolated from all other system components.

37. The method of claim 31 further including an internal interface that provides various secure-platform-kernel mechanisms, including:
memory management mechanisms;
dispatch mechanisms;
exception mechanisms;
interrupt mechanisms;
debug and monitoring mechanisms;
cryptographic mechanisms;
cryptographic storage mechanisms;
secure repository mechanisms; and
secure repository storage mechanisms.

38. The method of claim 31 further including providing a secure boot process incorporated within hardware, software, and firmware that authenticates and validates each firmware and software routine executed to initialize the system up to execution of an operating system.

39. The method of claim 38 wherein the secure boot process validates each firmware and software routine prior to execution of the firmware or software routine, including operating-system routines and user-application programs.

40. Computer instructions that implement a software portion of the combined-hardware-and-software secure-platform interface provided by the method of claim 31.

41. A computer system comprising at least one user-level program, at least one operating system, a hardware platform, and the combined-hardware-and-software secure-platform provided by the method of claim 31.

42. A combined-hardware-and-software secure platform comprising:
a hardware layer providing a means for executing a process or routine at one of a number of privilege levels, privileged instructions and privileged registers, non-privileged instructions and non-privileged registers, a means for compartmentalizing memory to control access by a process or routine to a unit of memory, and a means for partitioning memory into sets of regions, each region comprising a number of memory units;

a means for providingsecure-platform management services for operational control of hardware resources that do not expose privileged instructions and privileged registers of the hardware and that do not simulate privileged instructions and privileged registers and security-management services that employ internally generated secret data, each security-management service managing internal secret data without exposing the internal secret data to computational entities other than the security-management service; and an interface means that conceals the privileged instructions and privileged registers while providing, to calling operating-system or customized-control-access routines, access to the non-privileged instructions and non-privileged registers provided by the hardware instruction-set architecture and to the secure-platform management services and security-management services.

* * * * *

UNITED STATES PATENT AND TRADEMARK OFFICE
CERTIFICATE OF CORRECTION

PATENT NO. : 7,073,059 B2 Page 1 of 1
APPLICATION NO. : 10/118646
DATED : July 4, 2006
INVENTOR(S) : William S. Worley, Jr. et al.

It is certified that error appears in the above-identified patent and that said Letters Patent is hereby corrected as shown below:

Inventor's name:
        is incorrectly spelled as: "William S. Worely, Jr."

should be -- William S. Worley, Jr. --

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,073,059 B2 |
| APPLICATION NO. | : 10/118646 |
| DATED | : July 4, 2006 |
| INVENTOR(S) | : William S. Worely, Jr. et al. |

It is certified that error appears in the above-identified patent and that said Letters Patent is hereby corrected as shown below:

In column 7, lines 44-45, delete "functionally" and insert -- functionality --, therefor.

In column 25, line 18, delete "functionally" and insert -- functionality --, therefor.

Signed and Sealed this

Twenty-fourth Day of November, 2009

David J. Kappos
*Director of the United States Patent and Trademark Office*